United States Patent
Jin et al.

(10) Patent No.: US 10,783,409 B2
(45) Date of Patent: Sep. 22, 2020

(54) FONT REPLACEMENT BASED ON VISUAL SIMILARITY

(71) Applicant: Adobe Inc., San Jose, CA (US)

(72) Inventors: Hailin Jin, San Jose, CA (US);
Zhaowen Wang, San Jose, CA (US);
Gavin Stuart Peter Miller, Los Altos, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/502,608

(22) Filed: Jul. 3, 2019

(65) Prior Publication Data

US 2019/0325277 A1 Oct. 24, 2019

Related U.S. Application Data

(63) Continuation of application No. 16/013,791, filed on Jun. 20, 2018, now Pat. No. 10,380,462, which is a (Continued)

(51) Int. Cl.
*G06F 17/00* (2019.01)
*G06K 9/68* (2006.01)
(Continued)

(52) U.S. Cl.
CPC ......... *G06K 9/6828* (2013.01); *G06F 40/109* (2020.01); *G06N 3/0454* (2013.01);
(Continued)

(58) Field of Classification Search
CPC ..... G06F 40/109; G06F 40/10; G06K 9/6828; G06N 3/08; G06N 7/005; G06N 5/025; G06N 3/0454
See application file for complete search history.

(56) References Cited

U.S. PATENT DOCUMENTS 5,034,991 A * 7/1991 Hagimae .............. G06K 9/3283
382/171
5,060,276 A 10/1991 Morris
(Continued)

OTHER PUBLICATIONS

"Combined Search and Examination Report", GB Application No. 1710177.5, dated Dec. 13, 2017, 6 pages.
(Continued)

*Primary Examiner* — Laurie A Ries
(74) *Attorney, Agent, or Firm* — SBMC

(57) ABSTRACT

Font replacement based on visual similarity is described. In one or more embodiments, a font descriptor includes multiple font features derived from a visual appearance of a font by a font visual similarity model. The font visual similarity model can be trained using a machine learning system that recognizes similarity between visual appearances of two different fonts. A source computing device embeds a font descriptor in a document, which is transmitted to a destination computing device. The destination compares the embedded font descriptor to font descriptors corresponding to local fonts. Based on distances between the embedded and the local font descriptors, at least one matching font descriptor is determined. The local font corresponding to the matching font descriptor is deemed similar to the original font. The destination computing device controls presentations of the document using the similar local font. Computation of font descriptors can be outsourced to a remote location.

20 Claims, 13 Drawing Sheets

Related U.S. Application Data continuation of application No. 15/269,492, filed on Sep. 19, 2016, now Pat. No. 10,007,868.

(51) Int. Cl.
*G06N 3/04* (2006.01)
*G06N 3/08* (2006.01)
*G06F 40/109* (2020.01)
*G06N 5/02* (2006.01)
*G06N 7/00* (2006.01)

(52) U.S. Cl.
CPC ............... *G06N 3/08* (2013.01); *G06N 5/025* (2013.01); *G06N 7/005* (2013.01)

(56) References Cited

U.S. PATENT DOCUMENTS

| | | | |
|---|---|---|---|
| 5,167,013 | A | 11/1992 | Hube et al. |
| 5,524,182 | A | 6/1996 | Chari et al. |
| 5,617,484 | A | 4/1997 | Wada et al. |
| 5,664,086 | A | 9/1997 | Brock |
| 5,754,187 | A | 5/1998 | Ristow et al. |
| 5,806,078 | A | 9/1998 | Hug et al. |
| 7,228,501 | B2 | 6/2007 | Brown et al. |
| 7,478,325 | B2 | 1/2009 | Foehr et al. |
| 8,271,470 | B2 | 9/2012 | Gonzalez et al. |
| 8,330,760 | B1 | 12/2012 | Arnold et al. |
| 8,385,971 | B2 | 2/2013 | Rhoads et al. |
| 8,429,524 | B2 | 4/2013 | Balinsky et al. |
| 8,509,537 | B2 | 8/2013 | Perronnin et al. |
| 9,021,020 | B1 | 4/2015 | Ramaswamy et al. |
| 9,047,511 | B1 | 6/2015 | Vargis C et al. |
| 9,171,202 | B2 | 10/2015 | Hull et al. |
| 9,202,142 | B1 | 12/2015 | Conboy et al. |
| 9,224,068 | B1 | 12/2015 | Ranzato |
| 9,336,204 | B1* | 5/2016 | Amundsen ............ G06F 40/247 |
| 9,501,724 | B1 | 11/2016 | Yang et al. |
| 9,576,196 | B1 | 2/2017 | Natarajan |
| 9,805,288 | B2* | 10/2017 | Kaasila ................ G06F 40/194 |
| 9,824,304 | B2 | 11/2017 | Wang et al. |
| 9,875,429 | B2 | 1/2018 | Wang et al. |
| 10,007,868 | B2 | 6/2018 | Jin et al. |
| 10,074,042 | B2 | 9/2018 | Wang et al. |
| 10,380,462 | B2 | 8/2019 | Jin et al. |
| 10,467,508 | B2 | 11/2019 | Wang et al. |
| 10,699,166 | B2 | 6/2020 | Wang et al. |
| 2005/0246410 | A1 | 11/2005 | Chen et al. |
| 2006/0062460 | A1 | 3/2006 | Jun et al. |
| 2006/0078204 | A1 | 4/2006 | Fujimoto et al. |
| 2006/0236237 | A1 | 10/2006 | Peiro et al. |
| 2008/0303822 | A1 | 12/2008 | Taylor et al. |
| 2009/0028443 | A1 | 1/2009 | Chen et al. |
| 2009/0184980 | A1 | 7/2009 | Mansfield |
| 2010/0010948 | A1 | 1/2010 | Ito et al. |
| 2010/0183217 | A1 | 7/2010 | Seung et al. |
| 2010/0324883 | A1 | 12/2010 | Platt et al. |
| 2011/0115797 | A1 | 5/2011 | Kaplan |
| 2011/0202487 | A1 | 8/2011 | Koshinaka |
| 2011/0271180 | A1 | 11/2011 | Lee |
| 2011/0276872 | A1* | 11/2011 | Kataria ................ G06F 40/109 715/234 |
| 2011/0289407 | A1 | 11/2011 | Naik et al. |
| 2011/0295612 | A1 | 12/2011 | Donneau-Golencer et al. |
| 2012/0078908 | A1 | 3/2012 | Djordjevic et al. |
| 2012/0240039 | A1 | 9/2012 | Walker et al. |
| 2013/0054612 | A1* | 2/2013 | Danielyan ............ G06F 40/284 707/741 |
| 2013/0060786 | A1 | 3/2013 | Serrano et al. |
| 2015/0062140 | A1 | 3/2015 | Levantovsky et al. |
| 2015/0063713 | A1* | 3/2015 | Yang .................... G06K 9/4671 382/225 |
| 2015/0097842 | A1 | 4/2015 | Kaasila et al. |
| 2015/0278167 | A1* | 10/2015 | Arnold ................ G06K 9/6828 382/155 |
| 2015/0339273 | A1 | 11/2015 | Yang et al. |
| 2015/0348278 | A1 | 12/2015 | Cavedoni et al. |
| 2015/0348297 | A1 | 12/2015 | Kaasila et al. |
| 2015/0348300 | A1 | 12/2015 | Kaplan |
| 2015/0371397 | A1 | 12/2015 | Wang et al. |
| 2016/0259995 | A1 | 9/2016 | Ishii et al. |
| 2016/0292589 | A1 | 10/2016 | Taylor et al. |
| 2016/0307347 | A1* | 10/2016 | Matteson ............... G06F 40/109 |
| 2016/0314377 | A1 | 10/2016 | Vieira et al. |
| 2017/0091951 | A1 | 3/2017 | Yoo et al. |
| 2017/0098138 | A1 | 4/2017 | Wang et al. |
| 2017/0098140 | A1 | 4/2017 | Wang et al. |
| 2017/0098141 | A1 | 4/2017 | Wang et al. |
| 2017/0109600 | A1 | 4/2017 | Voloshynovskiy et al. |
| 2017/0262414 | A1* | 9/2017 | Pao ....................... G06F 40/109 |
| 2018/0082156 | A1 | 3/2018 | Jin et al. |
| 2018/0114097 | A1 | 4/2018 | Wang et al. |
| 2018/0239995 | A1 | 8/2018 | Wang et al. |
| 2018/0247386 | A1 | 8/2018 | Zheng et al. |
| 2018/0253878 | A1 | 9/2018 | Jain et al. |
| 2018/0253883 | A1 | 9/2018 | Shanbhag |
| 2018/0300592 | A1 | 10/2018 | Jin et al. |
| 2020/0034671 | A1 | 1/2020 | Maung |

OTHER PUBLICATIONS

"Corrected Notice of Allowance", U.S. Appl. No. 14/876,609, dated Jun. 29, 2018, 2 pages.

"Corrected Notice of Allowance", U.S. Appl. No. 14/876,660, dated Jul. 20, 2017, 4 pages.

"Corrected Notice of Allowance", U.S. Appl. No. 14/876,660, dated Oct. 25, 2017, 2 pages.

"Corrected Notice of Allowance", U.S. Appl. No. 14/876,667, dated Oct. 18, 2017, 2 pages.

"Corrected Notice of Allowance", U.S. Appl. No. 15/269,492, dated Feb. 13, 2018, 5 pages.

"CSS Fonts Module Level 3", Retrieved at: https://drafts.csswg.org/css-fonts/, Jan. 19, 2016, 88 pages.

"First Action Interview Office Action", U.S. Appl. No. 16/013,791, dated Jan. 18, 2019, 3 pages.

"First Action Interview Pre-Interview Communication", U.S. Appl. No. 15/269,492, dated Oct. 24, 2017, 3 pages.

"Intellectual property protection of typefaces—Wikipedia", Retrieved at: https://en.wikipedia.org/wiki/Intellectual_property_protection_of_typefaces—on Jun. 7, 2016, 4 pages.

"Notice of Allowance", U.S. Appl. No. 14/876,609, dated May 3, 2018, 8 pages.

"Notice of Allowance", U.S. Appl. No. 14/876,660, dated Jul. 6, 2017, 8 pages.

"Notice of Allowance", U.S. Appl. No. 14/876,667, dated Sep. 13, 2017, 16 pages.

"Notice of Allowance", U.S. Appl. No. 15/269,492, dated Jan. 18, 2018, 17 pages.

"Notice of Allowance", U.S. Appl. No. 15/962,514, dated Jun. 21, 2019, 13 pages.

"Notice of Allowance", U.S. Appl. No. 16/013,791, dated Mar. 29, 2019, 10 pages.

"Pre-Interview Communication", U.S. Appl. No. 14/876,609, dated Feb. 21, 2018, 3 pages.

"Pre-Interview Communication", U.S. Appl. No. 14/876,660, dated Mar. 17, 2017, 3 pages.

"Pre-Interview Communication", U.S. Appl. No. 14/876,667, dated Jul. 28, 2017, 3 pages.

"Pre-Interview First Office Action", U.S. Appl. No. 15/962,514, dated Apr. 15, 2019, 3 pages.

"Pre-Interview First Office Action", U.S. Appl. No. 16/013,791, dated Nov. 23, 2018, 4 pages.

"Restriction Requirement", U.S. Appl. No. 14/876,609, dated Sep. 15, 2017, 7 pages.

"Restriction Requirement", U.S. Appl. No. 15/962,514, dated Feb. 14, 2019, 6 pages.

"Supplemental Notice of Allowance", U.S. Appl. No. 14/876,667, dated Dec. 27, 2017, 2 pages.

(56) References Cited

OTHER PUBLICATIONS

"W3C Recommendation—Fonts", Retrieved at: https://www.w3.org/TR/2011/REC-CSS2-20110607/fonts.html, 2011, 9 pages.

Bell,"Learning visual similarity for product design with convolutional neural networks", ACM Transactions on Graphics (TOG)—Proceedings of ACM SIGGRAPH, Aug. 2015, 10 pages.

Cronin,"The Web Designer's Guide to Font Replacement Methods", Retrieved at: http://webdesign.tutsplus.com/articles/the-web-designers-guide-to-font-replacementmethods--webdesign-975, Aug. 3, 2011, 1 page.

Gaultney,"Font Licensing and Protection Details", Oct. 31, 2003, 3 pages.

O'Donovan,"Exploratory Font Selection Using Crowdsourced Attributes", ACM Transactions on Graphics, Jul. 27, 2014, 9 pages.

Oliver,"Font Replacement Methods: Techniques for Web Fonts", Retrieved at: http://www.instantshift.com/2013/08/29/font-replacement-methods/, Aug. 29, 2013, 11 pages.

Ross,"The Law on Fonts and Typefaces: Frequently Asked Questions", Retrieved at: http://blog.crowdspring.com/2011/03/font-law-licensing, Mar. 23, 2011, 7 pages.

Schoff,"FaceNet: A Unified Embedding for Face Recognition and Clustering", CVPR 2015, Mar. 12, 2015, pp. 815-823.

Wang,"DeepFont: Identify Your Font from an Image", 2015, Jul. 12, 2015, 9 pages.

Wang,"Learning Fine-grained Image Similarity with Deep Ranking", CVPR 2014, Apr. 7, 2014, 8 pages.

"Corrected Notice of Allowability", U.S. Appl. No. 15/962,514, dated Oct. 7, 2019, 2 pages.

"Designing Multiple Master Typefaces", Dec. 1995, 83 pages.

"Flexible Type: Methods and Applications of Modifying Glyph's Horizontal and Vertical Weight", Retrieved at: https://diglib.eg.org/handle/10.2312/egp20191039—on Aug. 7, 2019, 1 page.

"Font Embedding and Substitution", Retrieved at: https://helpx.adobe.com/acrobat/using/pdf-fonts.html—on Aug. 7, 2019, 6 pages.

"Multiple master fontshttps://en.wikipedia.org /wiki/Variable fonts", Retrieved at: https://en.wikipedia.org/wiki/Multiple_master_fontshttps://en.wikipedia.org/wiki/Variable_fonts—on Apr. 10, 2019, 1 page.

"Pre-Interview First Office Action", U.S. Appl. No. 15/853,120, dated Sep. 17, 2019, 3 pages.

"Variable fonts—Wikipedia", Retrieved at: https://en.wikipedia.org/wiki/Variable_fonts—on Apr. 10, 2019, 3 pages.

Hudson,"Introducing OpenType Variable Fonts", Sep. 14, 2016, 15 pages.

Knuth,"The Concept of a Meta-Fong", Dec. 1982, 25 pages.

Shamir,"Extraction of Typographic Elements from Outline Representations of Fonts", Aug. 1996, 12 pages.

"Final Office Action", U.S. Appl. No. 15/853,120, dated Feb. 4, 2020, 10 pages.

"Corrected Notice of Allowability", U.S. Appl. No. 15/853,120, dated May 7, 2020, 2 pages.

"Foreign Office Action", GB Application No. 1710177.5, dated Mar. 6, 2020, 4 pages.

"Notice of Allowance", U.S. Appl. No. 15/853,120, dated Mar. 30, 2020, 8 pages.

"Pre-Interview First Office Action", U.S. Appl. No. 16/505,374, dated Jul. 7, 2020, 3 pages.

"First Action Interview Office Action", U.S. Appl. No. 16/505,374, dated Jul. 28, 2020, 3 pages.

* cited by examiner

FONT REPLACEMENT BASED ON VISUAL SIMILARITY

RELATED MATTERS

This application is a continuation of and claims priority to U.S. patent application Ser. No. 16/013,791, filed on Jun. 20, 2018, which is a continuation of, and claims priority to U.S. patent application Ser. No. 15/269,492, filed on Sep. 19, 2016, and issued as U.S. Pat. No. 10,007,868, the disclosure of which is incorporated by reference herein.

BACKGROUND

Creative professionals often utilize a variety of pictures such as photographs, illustrations, or drawings as part of media content creation. Media content creation can include generation of many different types of designs, including those for marketing materials, backgrounds, book illustrations, presentations, web pages, and so forth. Creative professionals may personally create pictures that are incorporated into a design, or creative professionals may obtain pictures from external sources, such as from a content sharing service. Accordingly, even a single item of media content may have designs that include a variety of pictures obtained from a number of different sources. Each of these pictures is carefully selected to convey an intended meaning of the creative professional.

Although sometimes overlooked outside of the creative industry, the appearance of text in media content is also important to conveying the intended meaning of a given design. Different fonts are used to render text with different appearances in various designs. Designers carefully choose fonts to establish a mood, convey a desired aesthetic, engender an emotion, communicate a meaning, generate interest, provide a unifying theme, or simply to attract attention. Thus, the appearance of text is one of the top elements in design, including graphic design, web design, interaction design, and so forth.

Unfortunately, a problem arises when a design travels electronically from one computing device to another. To render text in accordance with a desired font, a computing device refers to the desired font to access instructions that describe how to draw individual characters of text. However, not all fonts are present on all computing devices. A font that is available on a source computing device may not be available on a destination computing device due to any of a number of possible reasons.

In some situations, a desired font can be embedded in a file having a given design. In these situations, the font is automatically communicated along with the design. But such embedding is not always feasible. First, technical issues may preclude embedding. For instance, there may not be sufficient bandwidth to include the font in the file having the design. Also, there is no guarantee that a destination computing device is capable of rendering text with a particular embedded font. Second, legal issues may preclude embedding a font into a file having a design. Generally, a person purchases a non-transferable right (e.g., a license) to use a font on a single computing device or a set number of computing devices. A user may therefore not have a legal right to embed a font into a design being transmitted to a destination computing device, or the destination computing device may lack a license to use the font legally.

For these reasons, embedding a font into a design is often infeasible. Consequently, a destination computing device may receive a design that identifies a font without embedding the identified font. The destination computing device is then responsible for determining a replacement font for the missing font. There are a couple of conventional approaches to determining a replacement font when a destination computing device receives a design without an embedded font. In a first conventional approach, the destination computing device uses a dialogue box to ask a user thereof to select a font. This is unhelpful to the user inasmuch as little if any guidance is provided to the user. Further, this approach makes no effort to reproduce the appearance of the text as intended by the designer.

In a second conventional approach, the destination computing device attempts to match a local font to the identified, but missing, font. The destination computing device attempts to find a matching font that is similar to the identified font using heuristics. A heuristics-based technique uses, for example, font metadata embedded in a design that specifies such things as font family, weight, regular versus italics, recommended use, and so forth. The embedded font metadata is compared to font metadata of local fonts to attempt to find a match. Unfortunately, heuristics-based techniques are ad-hoc and produce unpredictable results because fonts with similar metadata can have dramatically different appearances. Furthermore, heuristics rules tend to be fragile and capable of working with only a limited, predetermined set of known fonts.

Thus, conventional approaches to font replacement for when a design does not embed an identified font fail to maintain the visual appearance of text as desired by the creative professional that generated the design. Consequently, the overall intended meaning and effect of the design is compromised.

SUMMARY

Font replacement based on visual similarity is described. Instead of leaving a destination computing device solely responsible for determining an appropriate replacement font, a source computing device appends a font hint to a document that is to be transmitted to the destination computing device. In example embodiments, such a font hint is realized as a font descriptor that includes multiple font features derived from a visual appearance of the font by a font visual similarity model. The font visual similarity model is trained using a machine learning system tuned to recognize similarity between the visual appearances of two or more different fonts. In operation, a font visual similarity model at a source computing device computes a font descriptor using an image including multiple glyphs—which are the visible manifestation of characters—that are rendered using a desired font. By matching a received font descriptor with a local font descriptor at a destination computing device, a local font can be ascertained that matches a visual appearance of the desired font. Thus, instead of merely matching word-based labels that are tagged as font metadata, embodiments described herein enable font matching that is based on the actual visual appearances of the fonts.

In example embodiments for a source computing device, a document designed to include at least one font is provided to a document preparation module. The document preparation module ascertains the font present in the document. A font descriptor corresponding to the ascertained font is determined. The source computing device can determine the font descriptor locally or make a request to a remote location. A request to a remote location for a font descriptor uses an image including multiple glyphs that are rendered using the font. The font descriptor includes multiple font features derived from a visual appearance of the font using a font visual similarity model trained with machine learning. A font descriptor can comprise a per-character font descriptor. A per-character font descriptor includes multiple font features derived from a visual appearance of an individual character of a font using an image including a glyph of the individual character that is rendered using the font. The document preparation module appends the font descriptor to the document, regardless of whether the font descriptor is per-character or encompasses a greater diversity of characters. The source computing device transmits the document including the appended font descriptor to a remote computing device, such as a destination computing device.

In example embodiments for a destination computing device, the destination computing device receives from a remote computing device a document having a font descriptor appended thereto, with the font descriptor corresponding to a font of the document, such as at least one character thereof. The document, which includes the font descriptor and omits the corresponding font, is provided to a document presentation module. The document presentation module is implemented to present the document using a replacement font similar to the missing font. The font descriptor is extracted from the document. The font descriptor includes multiple font features derived from a visual appearance of the font using a font visual similarity model trained with machine learning. The document presentation module determines a similar font descriptor by comparing the extracted font descriptor to multiple font descriptors that respectively correspond to multiple local fonts that are available at the destination computing device. The determination of the similar font descriptor can be made based on respective semantic distances between the extracted font descriptor and the multiple font descriptors corresponding to the multiple local fonts. From among the multiple local fonts, the document presentation module ascertains a similar font that corresponds to the similar font descriptor. If the extracted font descriptor comprises a per-character font descriptor, the document presentation module can ascertain a similar font jointly for multiple per-character font descriptors or respective similar individual characters corresponding to respective similar per-character font descriptors. The destination computing device controls presentation of the document using the similar font, which includes at least a similar individual character, such as by causing the document to be displayed on a screen associated with the device or visible to a user.

In other example embodiments, a service computing device provides a service to a source computing device or a destination computing device to facilitate font replacement based on visual similarity. The service enables a document preparation module or a document presentation module to obtain a font descriptor from a remote location instead of by locally computing the font descriptor. The service computing device receives an image from a remote computing device, such as a source computing device or a destination computing device. The image includes multiple glyphs rendered using a font such that the image represents a visual appearance of the font. A font service module inputs the image including the multiple glyphs to a font visual similarity model trained with machine learning. The font service module further computes a font descriptor corresponding to the font, with the font descriptor including multiple font features derived from the visual appearance of the font by the font visual similarity model. The computation by the font service module can entail computing a per-character font descriptor corresponding to an individual character of a font, with the per-character font descriptor including include multiple font features derived from a visual appearance of the individual character of the font using an image including a glyph of the individual character that is rendered using the font. The service computing device then transmits the font descriptor to the remote computing device.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is presented with reference to the accompanying figures.

DETAILED DESCRIPTION

Overview

Figure 1:
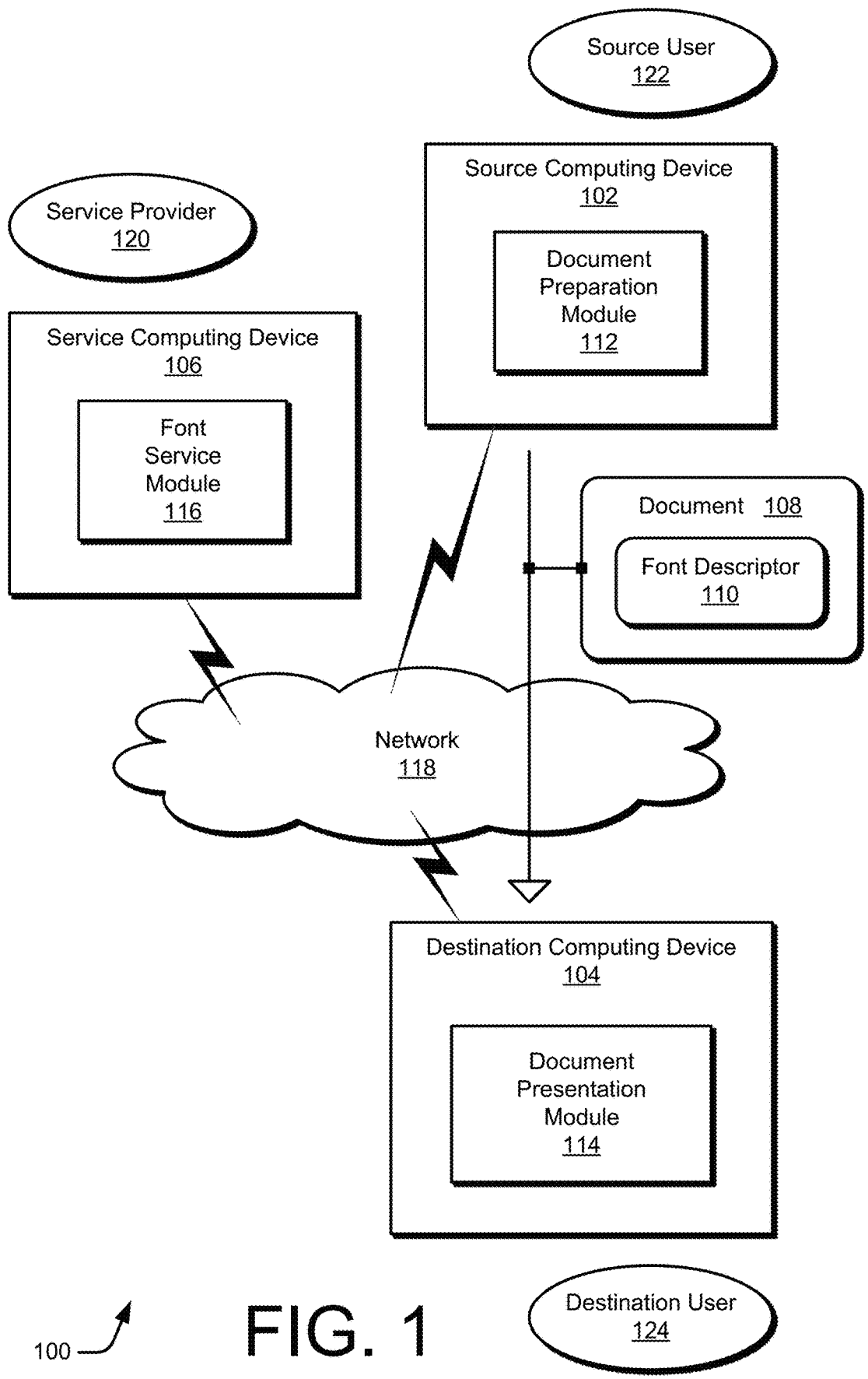
FIG. 1 illustrates an environment for example embodiments that are operable to employ techniques described herein that relate to font replacement based on visual similarity.

Due to technical and legal difficulties, designers are often precluded from embedding a font into a design or other type of document at a source computing device. After reception of a document that omits a font, a destination computing device therefore has to determine a replacement for the missing font prior to presenting the document. Asking a user to select a local font is inconvenient and time consuming for the user, and this approach does not provide any particular likelihood that the visual appearance of the font as desired by the original designer will be maintained. A user-independent heuristics-based approach to font replacement can be employed, but a heuristics-based approach is ad-hoc and is therefore both unreliable and limited in applicability. Consequently, conventional approaches to font replacement do not provide any reasonable expectation that the aesthetic intentions or communication goals of a given design can be maintained if a font is not embedded in a document.

To address these shortcomings, techniques and systems described herein enable font replacement to be based on visual similarity between two or more fonts. To do so, a source computing device appends a font hint to a document, which is to be transmitted to another a device. In example embodiments, such a font hint is realized as a font descriptor including multiple font features that are derived from a visual appearance of the font using a font visual similarity model. The font visual similarity model is trained using a machine learning system tuned to recognize similarity between the visual appearances of two different fonts. At a destination computing device, the appended font descriptor is compared to multiple font descriptors that respectively correspond to multiple local fonts. The local font corresponding to the font descriptor that matches the appended font descriptor is used to present the document. In these mariners, a missing font can be replaced by a local font that has a visually-similar appearance using a rigorous, consistent, and repeatable technique that is applicable to current and future fonts alike.

In some embodiments, aspects of various schemes for font replacement based on visual similarity are implemented by a document preparation module executing at a source computing device or by a document presentation module executing at a destination computing device. At the source computing device, a source user creates a document that originally includes a font. In other words, the document is designed with text to be rendered in accordance with the font selected by the source user. In this instance, however, the document is going to be transmitted without embedding the original selected font.

The document preparation module applies the font to a font visual similarity model. More specifically, an image of textual content rendered in accordance with the font is input to the font visual similarity model. Thus, the image includes at least one glyph rendered using the font. The font visual similarity model can be executing locally at the source computing device or at a remote location, such as a service computing device. The font visual similarity model is generated using machine learning and is trained to recognize similarities between the visual appearances of one or more fonts. A font visual similarity model can be realized using a convolutional artificial neural network or other artificial neural network.

Based on the image of the font, the font visual similarity model outputs a font descriptor that characterizes the visual appearance of the font using multiple font features. A font descriptor can be computed to encompass the visual appearance of multiple characters of a font or can be computed based on an individual character for a per-character approach to font replacement. Generally, a font descriptor computation can be performed on-demand for each current font of a document or preemptively for each local font at the source computing device. The document preparation module appends the font descriptor to the document, such as by incorporating the font descriptor into metadata of the document. The document preparation module of the source computing device then transmits the document having the font descriptor to the document presentation module of the destination computing device via at least one network.

At the destination computing device, the document presentation module receives the document having the font descriptor from the document preparation module. The font descriptor is extracted from the document. The document presentation module determines a similar font descriptor responsive to the extracted font descriptor. To do so, a font descriptor-to-local font database is consulted. The font descriptor-to-local font database includes multiple entries, with each entry associating a local font with a corresponding font descriptor. To populate the database, a font descriptor that corresponds to each local font is computed using a font visual similarity model generated using a machine learning system. The font descriptor computation can be performed locally at the destination computing device or at a remote location, such as a service computing device. The font descriptor computations for the local fonts may be performed on-demand or preemptively prior to receiving the document having the font descriptor.

As part of the determination of the similar font descriptor, the document presentation module compares the extracted font descriptor to the font descriptors in each of the entries of the font descriptor-to-local font database. Distances between the extracted font descriptor and respective ones of the font descriptors of the database entries are calculated. One or more of the smaller or smallest distances are ascertained. The document presentation module determines the similar font descriptor based on these ascertained distances. For example, the font descriptor that has the smallest distance from the extracted font descriptor can be ascertained as the similar font descriptor. The local font corresponding to this similar font descriptor is therefore considered a similar font with respect to the font that was originally included in the document by the source user. The document presentation module presents the document using the similar font. For instance, the document presentation module can use the destination computing device to display the document with at least some text rendered using the similar font.

In some embodiments, a service computing device is used to facilitate font replacement based on visual similarity. The service computing device enables a document preparation module or a document presentation module to obtain a font descriptor from a remote location instead of locally computing the font descriptor. In operation, the service computing device receives an image from a remote computing device, such as a source or destination computing device. The image includes text (e.g., at least one glyph) rendered using a font such that the image represents a visual appearance of the font. A font service module at the service computing device inputs the image including the rendered text into a font visual similarity model trained with a machine learning system to recognize similarities between the visual appearances of one or more different fonts.

The font service module further computes a font descriptor corresponding to the font, with the font descriptor including multiple font features derived from the visual appearance of the font using the font visual similarity model. If the image includes a single glyph for an individual character of the font, the font descriptor comprises a per-character font descriptor including multiple font features derived from a visual appearance of the individual character of the font using an image including the single glyph of the individual character that is rendered using the font. The service computing device then transmits the font descriptor back to the remote computing device. In some implementations, the service computing device has access to multiple different font visual similarity models corresponding to multiple versions of such models that are trained using different machine learning strategies. The service computing device can therefore accommodate scenarios in which font descriptors for local fonts are to be compared to a received font descriptor associated with a particular version value.

In these mariners, font replacement based on visual similarity enables a visual appearance of the text in a design to be maintained as a document containing the design is transmitted to another computing device, even if a font for the design is not embedded in the document. Systems and techniques as described herein can further provide a visually-similar replacement font for a font that is embedded in a document if a computing device is technically or legally precluded from using the embedded font. Further, especially in read-only scenarios in which additional glyphs will not be rendered at a destination computing device, a more visually-accurate emulation of a font as intended by a designer may be achieved using a per-character approach to font replacement. The described approaches and schemes can operate with both existing and future fonts, across various operating systems and platforms, and with desktop as well as cloud-based implementations.

In the following discussion, after some example terminology is set forth, an example environment is described that may employ the techniques described herein. Example embodiment systems, machines, and techniques are then described, followed by a section explaining example embodiment procedures and processes. The procedures and processes may be performed in the example environment and systems as well as in other environments. However, performance of the example procedures is not limited to the example environment or systems, and the example environment and systems are not limited to performance of the example procedures.

Terminology Examples

Example descriptions or explanations of certain terms as used herein are set forth below. Each term is applicable to one or more, but not necessarily all, embodiments that are presented herein. Some terms are further elucidated using one or more examples.

A "document" refers to a visible creation such as a design or an electronic file that embodies the visible creation. Examples of documents include marketing materials such as digital pamphlets, book illustrations, presentations such as slide decks, web pages, word processing products, content output via applications, combinations thereof, and so forth. A document can include text rendered in accordance with a given font. A "presentation" refers to displaying content, such as a document, on a display screen or printing the content to a hardcopy.

A "font" refers to a digital representation (e.g., a file or some code) of a typeface or a specific style thereof. Examples of typefaces include Times New Roman, Helvetica, Calibri, Baskerville Old Face, Britannic Bold, Neuropol, Vladimir Script, and Courier New. Historically, each typeface was one particular point size because letters were made from individual physical stamps. In modern digital environments, however, a font can include or be usable to produce characters at many different point sizes. A font may also be considered to include basic style variations or effects, such as italics or bold. A font provides instructions for digitally rendering text in accordance with the associated typeface.

A "local font" refers to a font that is present at, and available for rendering text on, a given computing device. The adjective "available" in the context of a "font" refers to when a computing device is legally and technically capable of using the font to render text. Conversely, an "unavailable font" refers to a font that is not present at a computing device or a font that the computing device is unable to use to render text due to legal constraints or technical abilities.

A "similar font" refers to a font having an appearance that is visually comparable to another font. Font similarity can be based on relative similarity, such as one or more fonts that are the most similar (e.g., have a smallest distance between two font descriptors) from among a set of available fonts. Alternatively, font similarity can be based on objective similarity, such as a maximum threshold distance between two font descriptors that respectively correspond to two different fonts. A "visually-similar font" refers to a font that is similar based on visible characteristics or attributes. In a character-by-character font replacement scenario, a similar font includes a similar individual character, and a visually-similar font includes a visually-similar individual character.

A "visual appearance" refers to visible characteristics or attributes of text rendered in accordance with a given font. The visual appearance can be separate from the instructions used to render a font or independent of font metadata, such as name, family, and so forth. Aspects of the visual appearance of a font are at least partially detectable by the human eye at some resolution. The visual appearance of a font can be embodied in an image of text rendered in accordance with the font. Related to the visual appearance of a font is a "distance" aspect between two or more font descriptors that indicates how similar two font descriptors are to one another, and thus how similar the two corresponding fonts are to each other. The distance between two font descriptors is determined by a destination computing device that receives a document having a font descriptor. A distance between two font descriptors is realized as, for example, a pairwise difference between two feature vectors.

An "image" refers to an output of a font. The output can be realized as some bitmapped product of the font having text that is rendered at some resolution. The image can include one or more glyphs rendered in accordance with the instructions of the font. For example, multiple glyphs that include a set of uppercase letters or a set of lowercase letters can be rendered. An image can also include a single glyph rendered for an individual character of a font.

A "glyph" refers to a physical shape or form that is perceivable by the human eye and connotes a corresponding textual character. A computing device renders a glyph on a display screen or on a physical hard copy. A glyph is specific to how a particular font renders a given character, but a character transcends multiple fonts. Examples of characters include a letter of an alphabet, a symbol, an ideograph, punctuation, an emoji, a logogram, or any other human-readable or interpretable form that can be represented as text using a computing device. Thus, fonts can include those directed to the Chinese, Japanese, or Korean character-based languages, as well as those directed to letter-based languages such as Western European ones.

"Machine learning" refers to technology in a digital environment that is capable of producing an output based on an input using knowledge or intelligence garnered from training. In a supervised learning implementation, training samples are input to a machine learning system during training so that the machine can learn about at least one relationship incorporated into the training samples, such as font similarity. After the training, a machine learning apparatus can produce an output based on an input using the learned relationship. Examples of implementation techniques for machine learning for unsupervised or supervised learning may include association rule learning, support vector machines (SVMs), Bayesian networks, regression, artificial neural networks, convolutional neural networks, deep learning, and combinations thereof. As used herein, a "machine learning system" can produce a model that incorporates a learned relationship.

A "font visual similarity model" refers to a model produced with machine learning so as to characterize fonts such that the fonts can be compared to one another in terms of at least visual similarity. A font visual similarity model can be implemented as, for example, a processor-executable module, a convolutional artificial neural network, or a combination thereof. If an image including multiple glyphs that are rendered by a given font is input to a font visual similarity model, the model can output a font descriptor having multiple font features that correspond to visual appearance aspects of the given font.

A "font descriptor" refers to a product of a font visual similarity model that characterizes a visual appearance of a font using font features. A font descriptor corresponding to one font can be compared to a font descriptor corresponding to another font to compute a semantic distance between the two fonts, with the semantic distance indicative of a visual similarity between the two fonts. "Font features" refer to different dimensions for characterizing the visual appearance of a font. Font features result from application of machine learning technology to the font image. A "per-character font descriptor" refers to a font descriptor that is directed to an individual character of a font.

A "similar font descriptor" refers to a font descriptor that is computationally close to another font descriptor. Closeness can be based on relative closeness, such as one or more font descriptors that have the (e.g., five) smallest distances to a given font descriptor from among a set of font descriptors corresponding to local fonts. Alternatively, font descriptor closeness can be based on objective closeness, such as a maximum threshold semantic distance between two different font descriptors that respectively correspond to two different fonts. In a per-character font replacement scenario, a similar font descriptor can be based on aggregated distances or can include a similar per-character font descriptor.

A "remote computing device" refers to a computing device that is separated from a given computing device by a communication coupling, such as a network connection, and that has a different ownership, management, user, or legal licensing basis (e.g., which may be per-machine). The term "controlling" refers to indirectly or directly, or locally or remotely, causing a computing device to perform an operation or preventing the computing device from performing an operation. For example, a smartphone device may cause a printer to print a document via a wireless connection. Also, a web server may cause a tablet device to display a document. The term "appending" refers to inserting, adding, incorporating, tagging, coupling, or some combination thereof, and so forth some item to a file, such as a document. For example, a font descriptor can be incorporated into metadata of a document.

Also, unless context dictates otherwise, use herein of the word "or" may be considered use of an "inclusive or," or a term that permits inclusion or application of one or more items linked by the word "or" (e.g., a phrase "A or B" may be interpreted as permitting or being relevant to just "A," to just "B," or to both "A" and "B"). Further, items represented in the accompanying figures and terms discussed herein may be indicative of one or more items or terms, and thus reference may be made interchangeably to single or plural forms of the items and terms in this written description.

Example Environment

FIG. 1 illustrates an environment 100 for example embodiments that are operable to employ techniques described herein that relate to font replacement based on visual similarity. As depicted from top to bottom, the example environment 100 includes at least one source user 122, at least one source computing device 102, at least one service provider 120, at least one service computing device 106, at least one document 108, at least one network 118, at least one destination computing device 104, and at least one destination user 124. The source computing device 102 includes a document preparation module 112 and is associated with the source user 122. The destination computing device 104 includes a document presentation module 114 and is associated with the destination user 124. The service computing device 106 includes a font service module 116 and is associated with the service provider 120.

In one or more embodiments, the source user 122 creates or possesses the document 108. The document 108 includes text in an original font (not shown in FIG. 1) that is selected by the source user 122, which is the document designer here. The document preparation module 112 prepares the document for dissemination (e.g., transmission to another computing device). To do so, the document preparation module 112 appends a font descriptor 110 to the document 108, with the font descriptor 110 corresponding to and derived from the font of the document 108. The source computing device 102 transmits the document 108 including the font descriptor 110 to the destination computing device 104 via the network 118.

At the destination computing device 104, the document presentation module 114 uses the font descriptor 110 to ascertain a matching font descriptor. The matching font descriptor corresponds to a local font that is visually similar to the original font. The document presentation module 114 then presents, such as displays, the document 108 to the destination user 124 using the similar local font. The service computing device 106 can facilitate font replacement based on visual similarity by interacting with the source or destination computing device via the network 118. For example, in response to receiving a font image from another device, the font service module 116 can return a font descriptor derived from the received font image.

The source computing device 102 or the destination computing device 104 can be implemented as an end-user computing device, such as a desktop or tablet computing device. Each can alternatively be implemented as a server computing device, such as a web server or cloud computing infrastructure. For example, the source computing device 102 can be implemented as a server computing device if a web server prepares a web page document for downloading to a web browser on an end-user device. Alternatively, the destination computing device 104 can be implemented as a server computing device if a server receives a document from an app executing on an end-user device, with the document to be published to a social media stream. The service computing device 106 can likewise be implemented as an end-user computing device or a server device.

Thus, the computing devices 102, 104, and 106 can be implemented as any suitable type of computing device. Examples of end-user computing devices include a desktop computer, a laptop or notebook computer, a mobile device (e.g., assuming a handheld configuration such as a mobile phone, a phablet, or a tablet), a mobile device coupled to a separate screen, an entertainment appliance such as a smart television, a game console, a wearable computing device such as a smart watch or intelligent glasses, a virtual or augmented reality device, a device configured to provide 2D or 3D image output, or some combination thereof. Hence, an end-user implementation of any of the computing devices may range from a relatively high-resource device with substantial memory and processor resources (e.g., a personal computer or game console) to a relatively low-resource device with constrained memory or processing resources (e.g., a mobile device such as a wearable computer). Examples of server computing devices include a web server, a server running open source software, a server of a proprietary design, a stand-alone server, a server blade, an allocated portion of a server farm, server functionality distributed across at least one data center, cloud computing functionality, or some combination thereof.

The computing devices 102, 104, or 106 can communicate with each other via the network 118. The network 118 may be formed from at least a portion of one or more network types. Examples of network types include a public network, a private network, the Internet, the Web, an Ethernet, an intranet, an extranet, a local area network (LAN), a wide area network (WAN), a wireless network, a wired network, a cellular network, an infrastructure network, an ad hoc network, a Bluetooth network, a Wi-Fi network, a Long-Term Evolution (LTE) network, a public-switched telephone network (PSTN), or some combination thereof. Each of the computing devices 102, 104, or 106 can include a variety of hardware components, such as a processing system, at least one processor, a memory, some combination thereof (e.g., on an application specific integrated circuit (ASIC) or as instructions are loaded into a processor), and so forth. A processing system is representative of functionality to perform operations through execution of instructions stored in a memory. These and other hardware components (not shown in FIG. 1) are contemplated as described herein with reference to FIG. 13.

In example implementations, each module 112, 114, or 116 is located at or executing on a respective computing device 102, 104, or 106. A module may be realized as a standalone application, may be part of a larger application, may be implemented as a downloaded application or web browser part, may be incorporated into an operating system (OS), may be implemented as a library or an application programming interface (API) available to another program, and so forth. Each module 112, 114, or 116 represents functionality to implement schemes and techniques for font replacement based on visual similarity as described herein. The modules can be implemented as at least part of a software package that executes on and specially configures one or more processors, which processors may physically realize a processing system; as a hardware apparatus, which may be realized as an ASIC or as an overall computing device; or using a combination of software, firmware, hardware, or fixed logic circuitry; with some combination thereof; and so forth. As described herein with reference to FIG. 13, each module may be fully or partially implemented as a web or cloud-based application or service. Further, although single devices are explicitly shown in FIG. 1, each illustrated device may be representative of a plurality of different devices or distributed computing resources that interoperate or coordinate to perform operations as a "web service," "over the cloud," or "in the cloud" as is known.

Having considered an example environment, consider now a discussion of some example details of the systems or techniques for font replacement based on visual similarity in accordance with one or more embodiments.

Systems and Techniques

This section describes some example details of systems and techniques for font replacement based on visual similarity in accordance with one or more embodiments.

Figure 2:
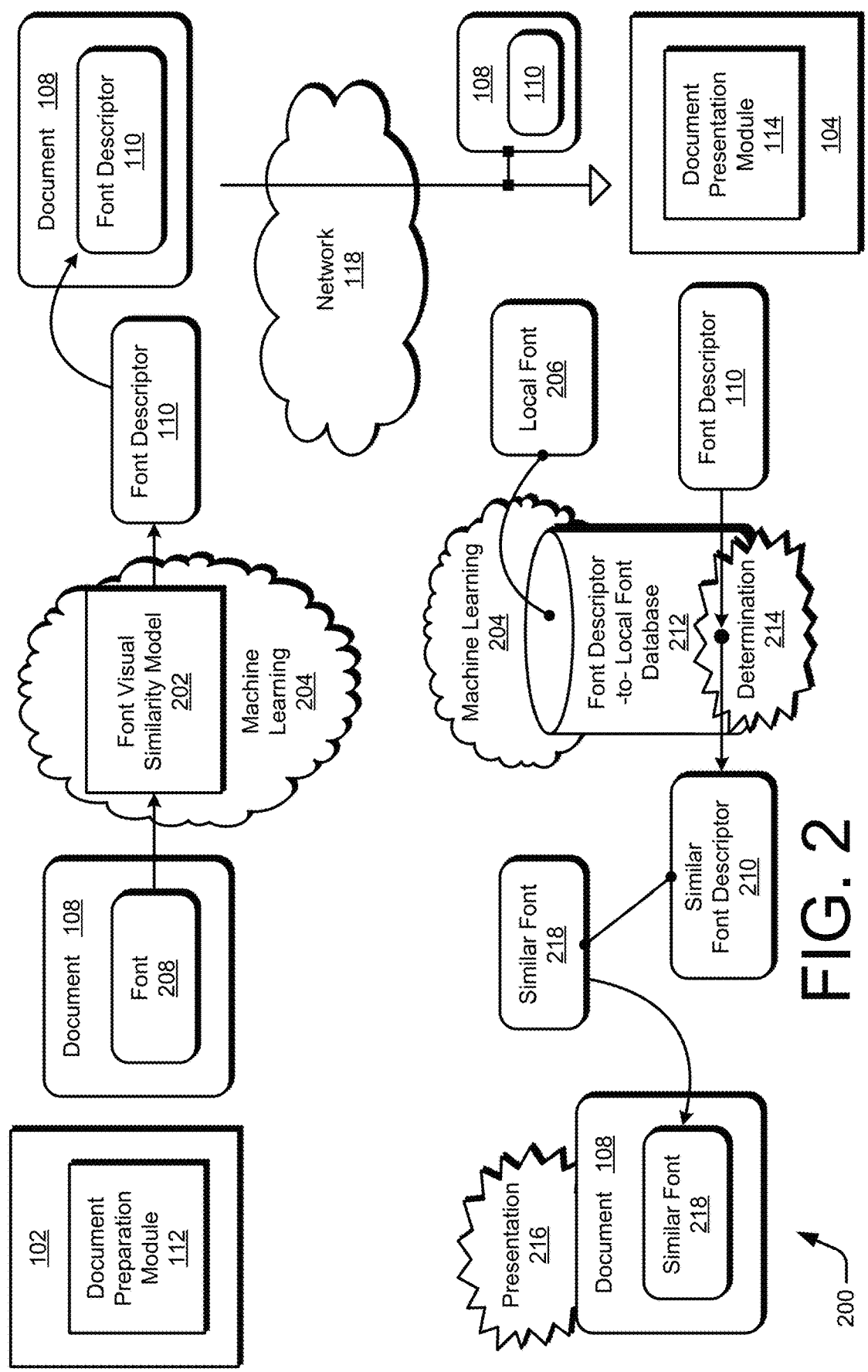
FIG. 2 illustrates an example scheme by a document preparation module and a document presentation module for font replacement based on visual similarity using machine learning.

FIG. 2 illustrates an example scheme 200 by a document preparation module 112 and a document presentation module 114 for font replacement based on visual similarity using machine learning 204. In example embodiments, the document preparation module 112 is executing at the source computing device 102. A source user 122 (of FIG. 1) creates a document 108 that includes a font 208. In other words, the document 108 is designed with text to be rendered in accordance with the font 208. In this instance, however, the document 108 is going to be transmitted without embedding the font 208.

The document preparation module 112 applies the font 208 to a font visual similarity model 202. More specifically, an image of textual output rendered in accordance with the font 208 is input to the font visual similarity model 202. The font visual similarity model 202 can be executing locally at the source computing device 102 or at a remote location, such as a service computing device 106 (of FIG. 1). The font visual similarity model 202 is generated using machine learning 204. An example generation of the font visual similarity model 202 is described herein with reference to FIG. 3. Based on the image of the font 208, the font visual similarity model 202 outputs a font descriptor 110 that characterizes the visual appearance of the font 208. The document preparation module 112 appends the font descriptor 110 to the document 108. Operations of the document preparation module 112 are described further herein with reference to FIG. 4. The document preparation module 112 then transmits the document 108 having the font descriptor 110 to the document presentation module 114 over the network 118.

The document presentation module 114 is executing at the destination computing device 104. The document presentation module 114 receives the document 108 having the font descriptor 110 from the document preparation module 112 via the network 118. The document presentation module 114 extracts the font descriptor 110 from the document 108. The document presentation module 114 makes a determination 214 of a similar font descriptor 210 responsive to the extracted font descriptor 110. To do so, a font descriptor-to-local font database 212 is consulted. The font descriptor-to-local font database 212 includes multiple entries, with each entry associating a local font 206 with a corresponding font descriptor. A font descriptor that corresponds to a local font 206 is computed using a font visual similarity model 202 generated with machine learning 204. The font descriptor computation can be performed locally at the destination computing device 104 or at a remote location, such as the service computing device 106. The computation for each of the local fonts 206 can be performed on-demand after receiving the document 108 or preemptively prior to receiving the document 108 having the font descriptor 110.

As part of the determination 214 of the similar font descriptor 210, the document presentation module 114 compares the extracted font descriptor 110 to the font descriptors in the entries of the font descriptor-to-local font database 212. Respective distances between the extracted font descriptor 110 and respective ones of the font descriptors of the database 212 are calculated. One or more of the smaller or smallest distances are ascertained. The document presentation module 114 determines the similar font descriptor 210 based on these ascertained distances. For example, the font descriptor in the database 212 that has the smallest distance from the extracted font descriptor 110 can be ascertained as the similar font descriptor 210. The local font 206 corresponding to the similar font descriptor 210 is therefore considered a similar font 218 with respect to the font 208 originally included in the document 108 by the source user 122. The document presentation module 114 makes a presentation 216 with the document 108 using the similar font 218. For instance, the document presentation module 114 can use the destination computing device 104 to display the document 108 with at least some text being rendered using the similar font 218. Operations of the document presentation module 114 are described further herein with reference to FIG. 5.

Figure 3:
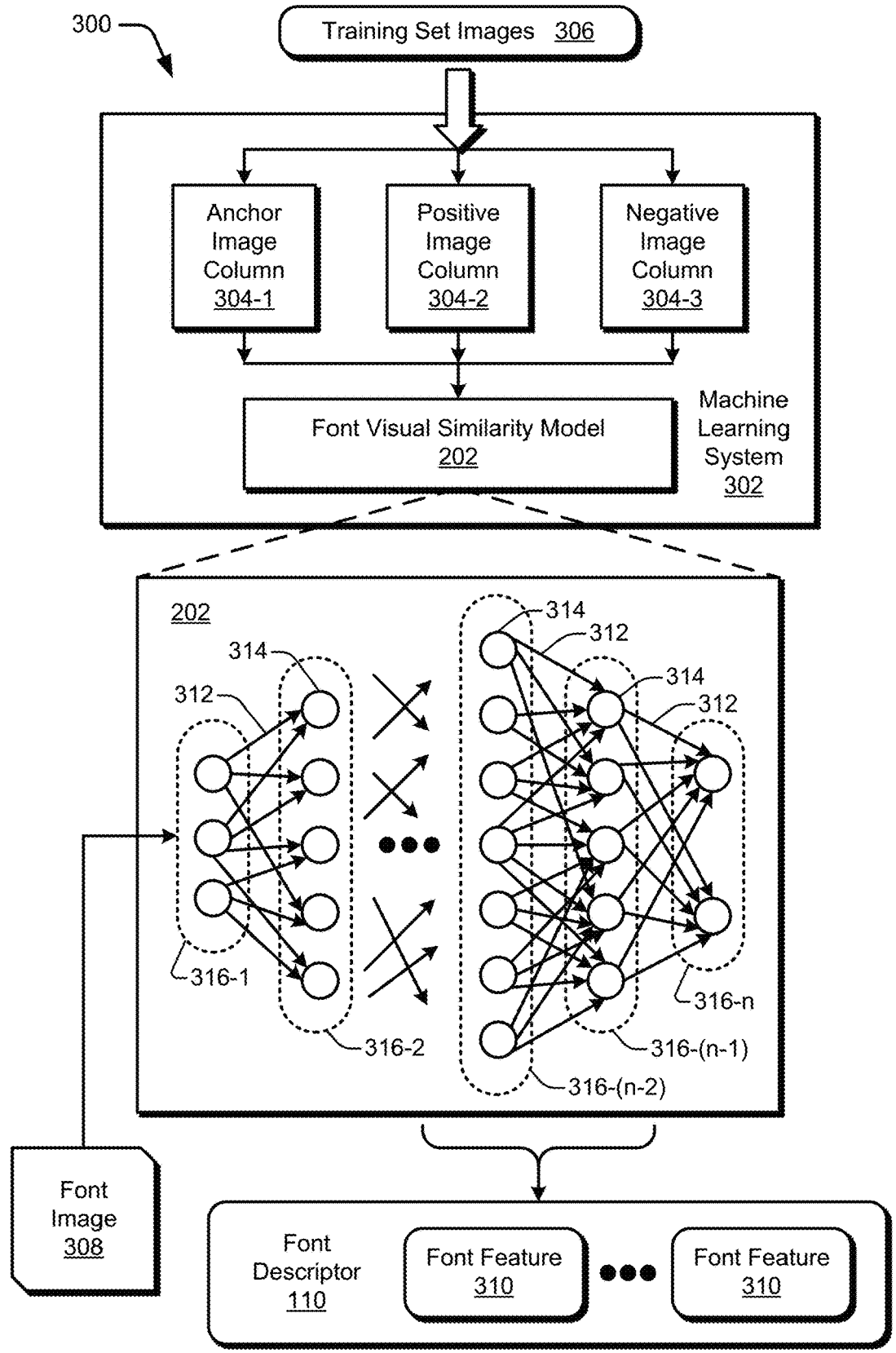
FIG. 3 illustrates an example machine learning environment to generate a font visual similarity model that can produce a font descriptor based on a font image.

FIG. 3 illustrates an example machine learning environment 300 to generate a font visual similarity model 202 that can produce a font descriptor 110 based on a font image 308. As illustrated, training set images 306 are input to a machine learning system 302 and processed to generate the font visual similarity model 202. The training set images 306 include images of text rendered using different fonts. In some embodiments, the machine learning system 302 is implemented using multiple columns 304. Each of the first, second, and third columns 304 processes a rendered glyph as an instance of the text for a particular font. The columns 304 include an anchor image column 304-1, a positive image column 304-2, and a negative image column 304-3.

The anchor image column 304-1 is provided with an anchor image including at least one glyph rendered using a given font type. The positive image column 304-2 is provided with a positive image including at least one glyph derived from the given font type. For example, the positive image glyph may be the same glyph as the anchor glyph with a perturbation (e.g., a rotation) or a different glyph from the same given font type. The negative image column 304-3 is provided with a negative image including at least one glyph rendered using a particular font type that differs from the given font type. Different training set images 306 are input to the machine learning system 302 and iterated until the system converges to generate the font visual similarity model 202.

Some machine learning systems operate with multiple layers. Artificial neural networks, for example, have multiple neuron-like nodes that are organized into multiple layers. In example embodiments, the font visual similarity model 202 includes multiple nodes 314 that are coupled to one another via one or more connections 312. The nodes 314 are organized into multiple layers 316. Multiple layers 316-1, 316-2 . . . 316-(n−2), 316-(n−1), 316-n are shown. The multiple layers 316 include an initial or input layer 316-1, a final or output layer 316-n, and multiple internal layers 316-2 to 316-(n−1). Each node 314 corresponds to an activity, and each connection 312 corresponds to a weight. During the iterations of the training to generate the font visual similarity model 202, the weights or the activities are adjusted to achieve a convergence.

In an example operation for computing a font descriptor 110, a font image 308 is input to the font visual similarity model 202. The font image 308 can be an image of one or more glyphs that are rendered in accordance with a given font to represent a visual appearance of the given font. The font image 308 is provided to the input layer 316-1. The corresponding font descriptor 110 is extracted or output from the nodal values of an internal layer, such as the layer 316-(n−2) or the layer 316-(n−1). The font descriptor 110 includes multiple font features 310 that are derived from the visual appearance of the font image 308. The font features 310 can respectively correspond to, for example, values of nodes 314 of the layer 316 from which the font descriptor 110 is extracted. By way of example, two font images 308 can be input to the font visual similarity model 202. One font image 308 includes uppercase glyphs for a font and another font image 308 includes lowercase glyphs for the font. The font features 310 for the uppercase and lowercase font images 308 are then concatenated to form the font descriptor 110 for the font.

Figure 4:
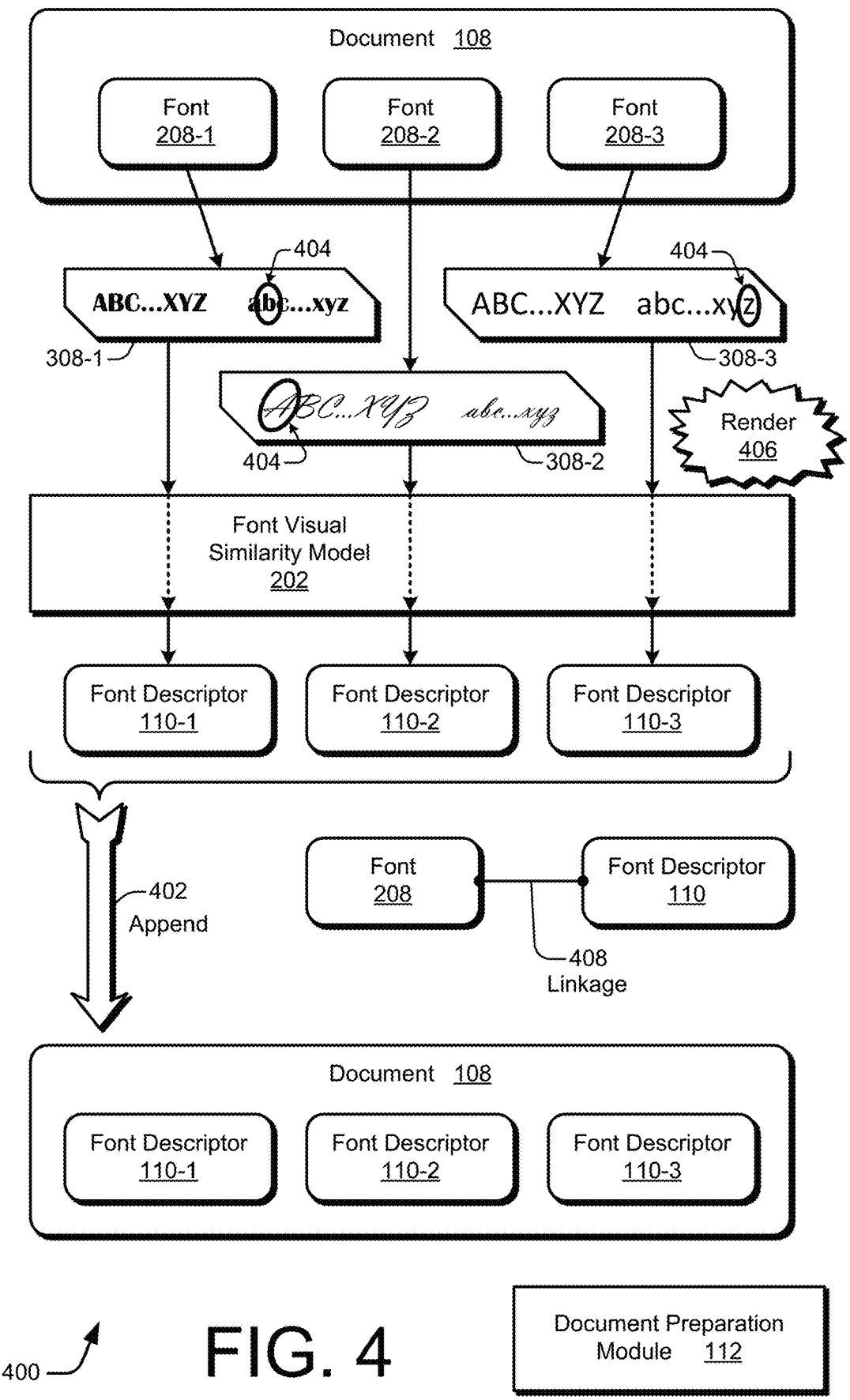
FIG. 4 illustrates an example approach to document preparation by a source computing device in which a font descriptor is appended to a document prior to transmission of the document.

FIG. 4 illustrates an example approach 400 to document preparation by a source computing device 102 (of FIG. 1) in which a font descriptor 110 is appended 402 to a document 108 prior to transmission of the document 108. In this example, the operation proceeds from top to bottom of FIG. 4, and the created document 108 includes three fonts 208-1, 208-2, and 208-3. However, more or fewer than three fonts 208 can be included in a document 108. Each font 208 corresponds to a font image 308 including multiple glyphs 404 that are rendered in accordance with the corresponding font 208. The document preparation module 112 can, for example, render 406 each image 308 to produce a bitmapped file representing a visual appearance of the corresponding font 208. Thus, fonts 208-1, 208-2, and 208-3 respectively correspond to images 308-1, 308-2, and 308-3.

The document preparation module 112 inputs each image 308 into the font visual similarity model 202. The font visual similarity model 202 produces a respective font descriptor 110 based on the visual appearance of the corresponding font 208 as realized by each respective font image 308. Hence, a font descriptor 110-1 corresponds to the font 208-1, a font descriptor 110-2 corresponds to the font 208-2, and a font descriptor 110-3 corresponds to the font 208-3. The document preparation module 112 appends 402 each respective font descriptor 110 to the document 108. Thus, the font descriptors 110-1, 110-2, and 110-3 are appended to the document 108. The font descriptor 110 can be appended by inserting the font descriptor 110 into the document 108, by adding the font descriptor 110 to metadata of the document 108, by using the font descriptor 110 as a font identifier in the document 108, some combination thereof, and so forth. Even if a font 208 is not embedded in a document 108, metadata for the font 208, such as a font name or family or description, can be included in the document 108.

In one example implementation, the document preparation module 112 determines a font descriptor 110 for a corresponding font 208 using the font visual similarity model 202 each time a document 108 is finalized or being prepared for transmission to a remote computing device. Alternatively, the document preparation module 112 determines a font descriptor 110 for a font 208 by accessing a data structure, such as a font descriptor-to-local font database 212 (of FIG. 2). To produce the font descriptor-to-local font database 212, the document preparation module 112 establishes a linkage 408 between a font 208 and a corresponding font descriptor 110. The linkage 408 is stored for subsequent use as an entry in the font descriptor-to-local font database 212 that associates the font 208 to the font descriptor 110. The linkages 408 can be created and stored on-demand as documents 108 are prepared for transmission or preemptively (e.g., pre-computed) prior to any particular font 208 being omitted from a document 108 being transmitted.

In other example implementations, the document preparation module 112 can determine a font descriptor 110 for a corresponding font 208 by making a request to a remote location, such as to a font service module 116 at a service computing device 106 (of FIG. 1). The remote location returns a font descriptor 110 based on a font image 308 sent as part of a request by the document preparation module 112. This implementation is described further with reference to FIG. 6. Requests to a remote location can be made on-demand or preemptively prefetched. Received font descriptors can be incorporated into a local font descriptor-to-local font database 212.

Figure 5:
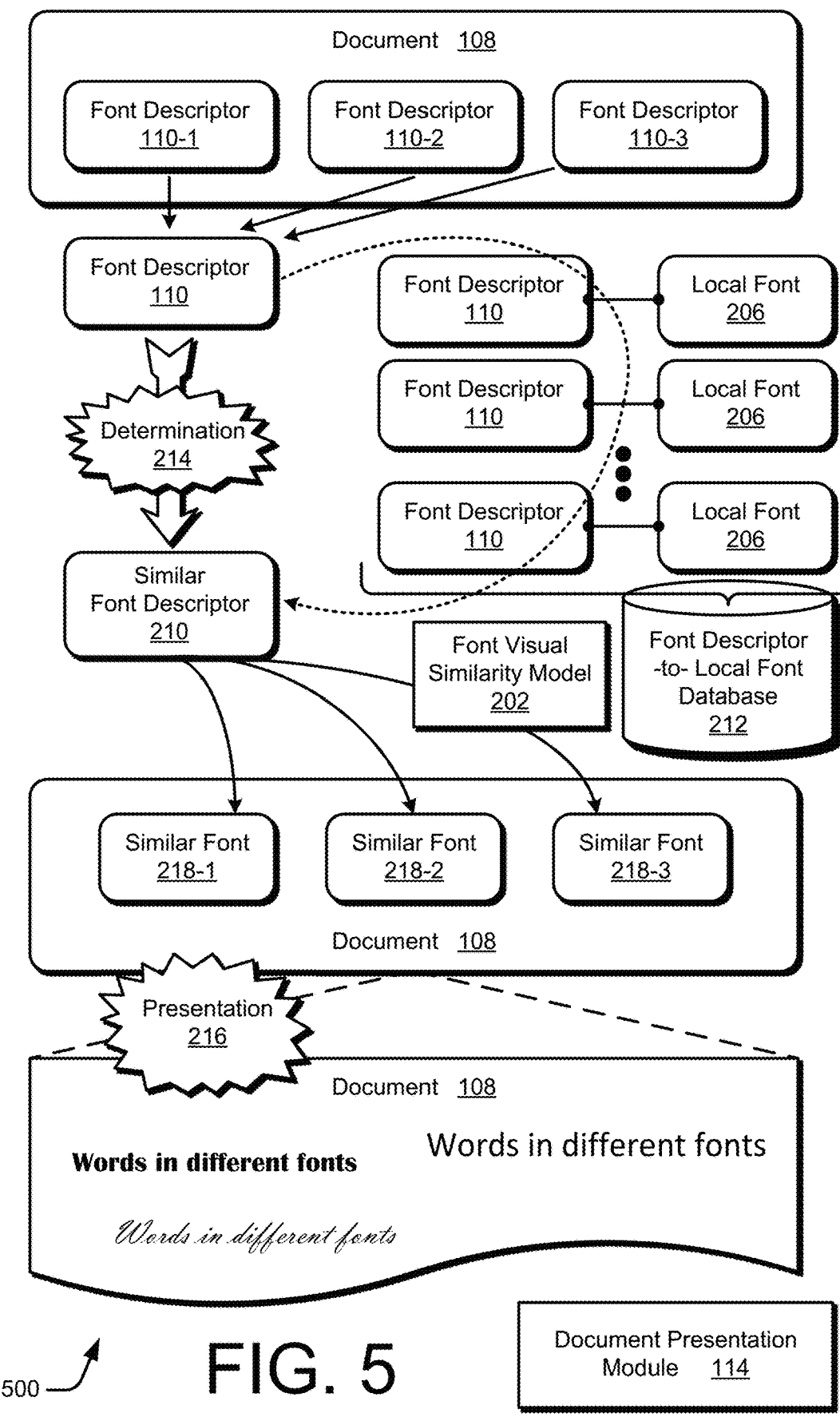
FIG. 5 illustrates an example approach to document presentation by a destination computing device in which a similar font is determined from a font descriptor of a document prior to presentation of the document.

FIG. 5 illustrates an example approach 500 to document presentation by a destination computing device 104 (of FIG. 1) in which a similar font 218 is determined from a font descriptor 110 of a document 108 prior to presentation of the document 108. In this example, the operation proceeds from top to bottom of FIG. 5, and the received document 108 includes three font descriptors 110-1, 110-2, and 110-3. The document presentation module 114 extracts a font descriptor 110 from the document 108. The document presentation module 114 determines 214 a similar font descriptor 210 based on the extracted font descriptor 110. To do so, a font descriptor-to-local font database 212 is consulted. The font descriptor-to-local font database 212 includes multiple entries. Each entry associates a local font 206 with a corresponding font descriptor 110. The font descriptor 110 that corresponds to a local font 206 is computed using a font visual similarity model 202. The font descriptor computation can be performed for each local font 206 on-demand after receiving the document 108 having a font descriptor 110 or preemptively prior to receiving the document 108. The font descriptor computation can be performed locally by the document presentation module 114 or at a remote location, such as a service computing device 106 (of FIG. 1). Implementations directed to a remote font descriptor computation are described with reference to FIG. 6.

As part of the determination 214, the document presentation module 114 compares the extracted font descriptor 110 to the font descriptors 110 in the entries of the font descriptor-to-local font database 212. Respective distances between the extracted font descriptor 110 and respective ones of the font descriptors 110 from the database 212 are calculated. The distances can comprise semantic distances indicative of how similar or not similar the visual appearances of two fonts are as captured by the respective font descriptors 110. One or more of the smaller or smallest distances are ascertained. The document presentation module 114 determines the similar font descriptor 210 based on these ascertained distances. For example, the font descriptor 110 having the smallest distance from the extracted font descriptor 110 can be ascertained as the similar font descriptor 210.

The local font 206 corresponding to the similar font descriptor 210 is therefore considered a similar font 218 with respect to the font 208 (of FIG. 4) that is originally included in the document 108 by the source user 122 (of FIG. 1). The document presentation module 114 makes a presentation 216 with the document 108 using the similar font 218. After repeating the determination 214 three times for each of the three font descriptors 110, three similar fonts 218-1, 218-2, and 218-3 are respectively determined based on the three font descriptors 110-1, 110-2, and 110-3. For instance, the document presentation module 114 can use the destination computing device 104 to display the document 108 with at least some text that is rendered using the similar fonts 218-1, 218-2, and 218-3. An example of such a presentation 216 is shown at the bottom of FIG. 5.

A document presentation module 114 can also determine multiple similar font descriptors 210 for a single received font descriptor 110. The document presentation module 114 can then display a collection of local fonts 206 that correspond to the multiple determined similar font descriptors 210. For example, the document presentation module 114 can display samples of the top n, with n representing some integer, matching similar fonts 218 to the destination user 124 and permit the destination user 124 to select a desired local font 206. Responsive to detection of a local font selection by the destination user 124 from among the collection of local fonts 206, the document presentation module 114 causes the presentation of the document 108 using the selected local font 206 as the similar font 218.

Figure 6:
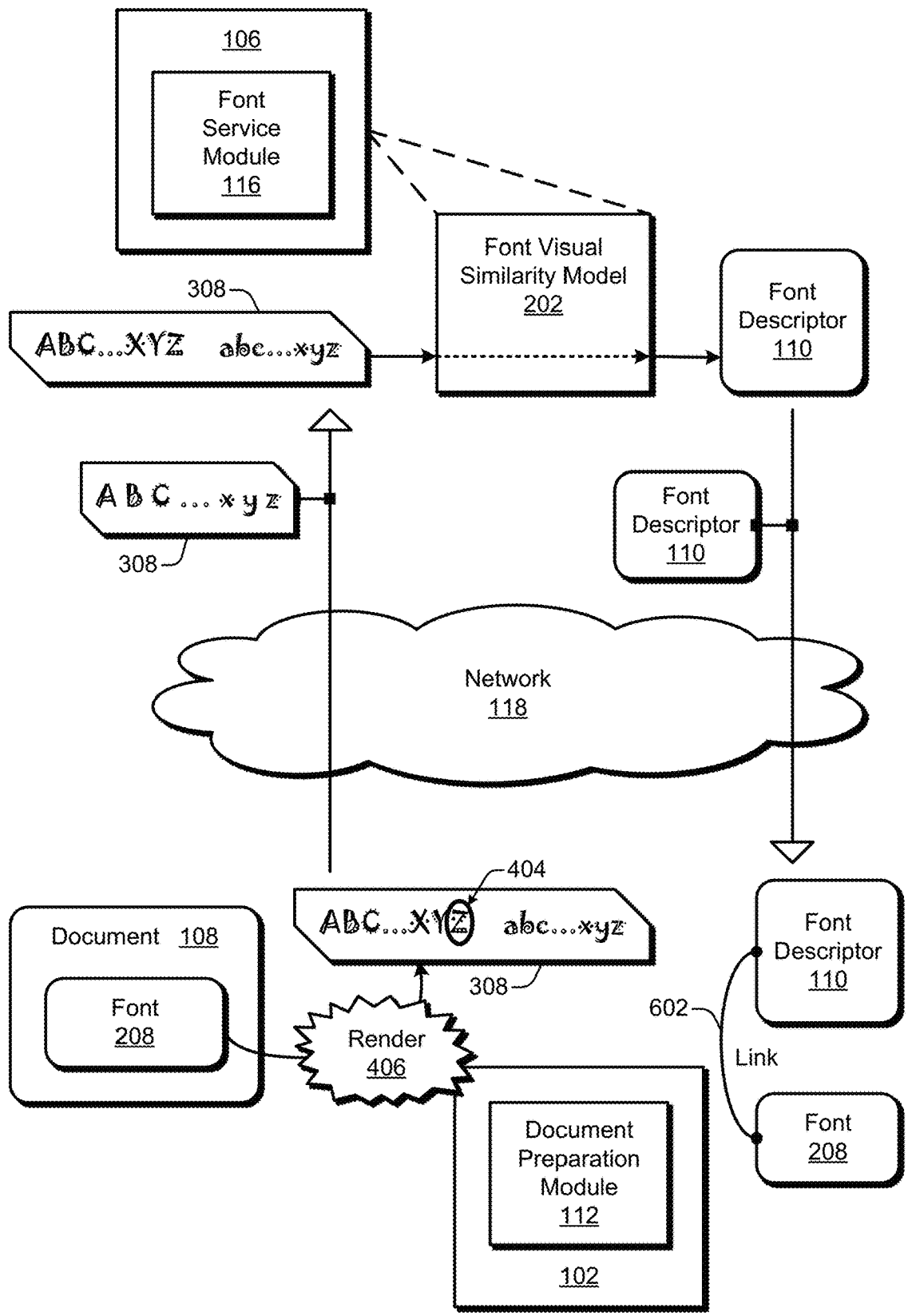
FIG. 6 illustrates an example approach to facilitating font replacement by a service computing device that determines a font descriptor for another computing device.

FIG. 6 illustrates an example approach 600 to facilitating font replacement by a service computing device 106 that determines a font descriptor 110 for another computing device. The other computing device can be a source computing device 102 or a destination computing device 104 (of FIG. 1). In the illustrated example, the other computing device is a source computing device 102 on which is executing a document preparation module 112. A font service module 116 is executing on the service computing device 106.

In example embodiments, the document preparation module 112 uses the font service module 116 to determine a font descriptor 110. The service computing device 106 includes or has access to a font visual similarity model 202. The document preparation module 112 is to prepare a document 108 for transmission by appending a font descriptor thereto that corresponds to the identified font 208. The document preparation module 112 renders 406 a font image 308 including multiple glyphs 404 in accordance with the identified font 208. The image 308 therefore represents a visual appearance of the font 208. The source computing device 102 transmits the image 308 to the service computing device 106 over the network 118.

At the service computing device 106, the font service module 116 inputs the image 308 into the font visual similarity model 202. The font visual similarity model 202 computes a corresponding font descriptor 110 derived from the visual appearance of the font 208 based on the font image 308. The font service module 116 returns the font descriptor 110 to the document preparation module 112 via the network 118. The document preparation module 112 can append the received font descriptor 110 to the document 108 prior to transmitting the document 108 to a destination computing device. The document preparation module 112 also links 602 the received font descriptor 110 with the corresponding font 208. The linkage enables the font 208 to be stored for future use in association with the font descriptor 110 in a data structure, such as a font descriptor-to-local font database 212 (of FIGS. 2 and 5). A document preparation module 112 or a document presentation module 114 can prefetch font descriptors 110 prior to preparing a document for transmission or prior to receiving a document to be presented, respectively.

Figure 7:
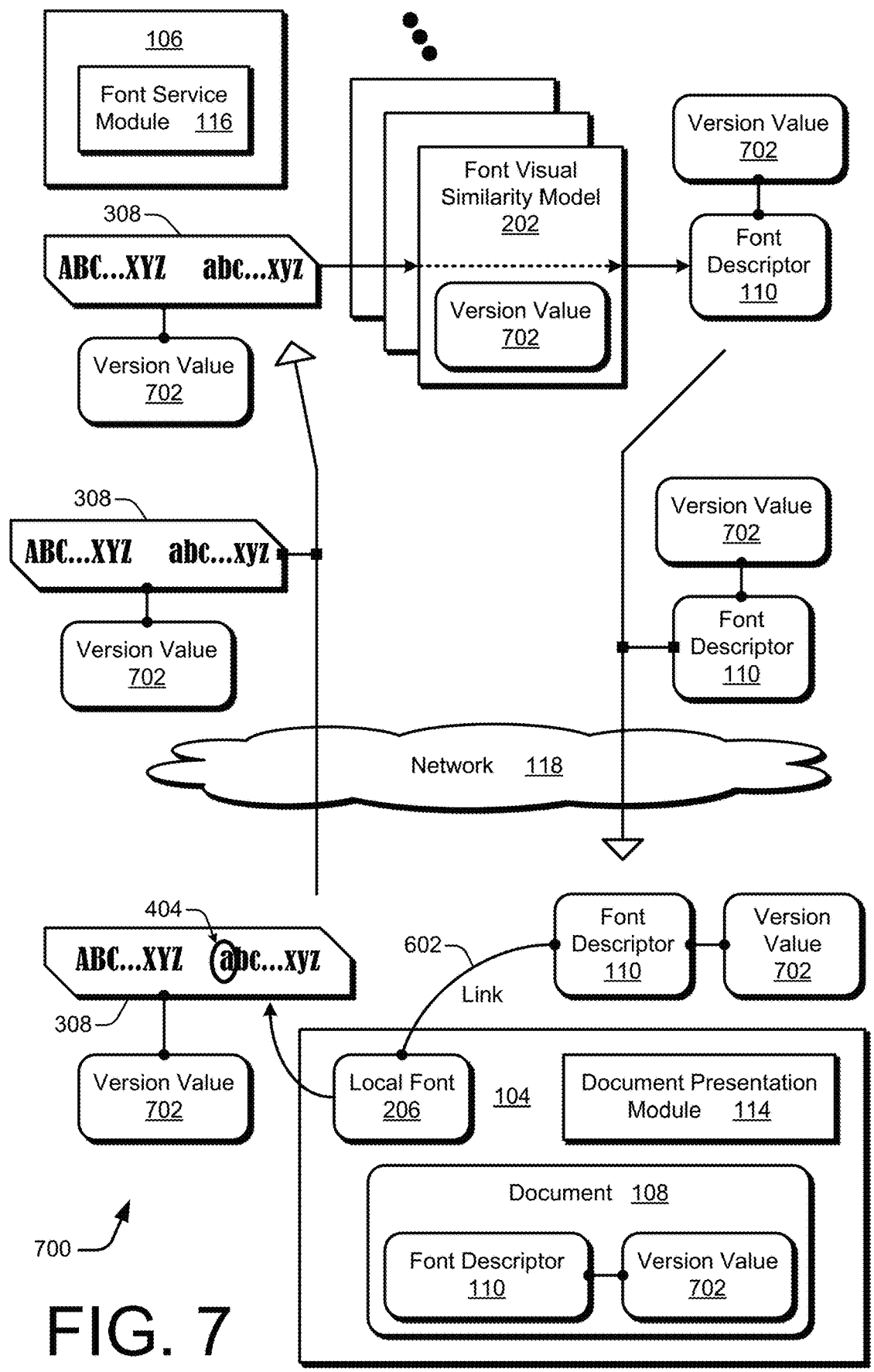
FIG. 7 illustrates example techniques to handle different font visual similarity models using a versioning scheme.

FIG. 7 illustrates generally at 700 example techniques to handle different font visual similarity models 202 using a versioning scheme. Generally, any given font visual similarity model 202 is capable of handling future fonts as well as currently-existing fonts. However, machine learning technology can change or evolve. A different type of machine learning algorithm can be employed to generate a font visual similarity model 202. Further, a training process for a same type of machine learning algorithm (e.g., a convolutional neural network) can be altered to produce font features that more accurately reflect the visual appearances of font images that are input to the model. Font visual similarity models 202 can therefore vary or evolve over time. Each different font visual similarity model 202 is considered a different version and is assigned a version value 702. To address these scenarios, a versioning scheme can be implemented, an example of which is described below.

A document presentation module 114 receives at a destination computing device 104 a document 108 including a font descriptor 110 associated with a version value 702. The associated version value 702 is indicative of the version of font visual similarity model 202 that was used to compute the font descriptor 110. Consequently, the document presentation module 114 is to determine font descriptors corresponding to local fonts 206 by a font visual similarity model 202 associated with the same version value 702. To do so, the document presentation module 114 produces a font image 308 including multiple glyphs 404 that are rendered using a local font 206. The destination computing device 104 transmits the image 308 in association with the version value 702 to a service computing device 106 via the network 118.

The service computing device 106 has access to multiple font visual similarity models 202, each of which corresponds to a version value 702. A font service module 116 selects a font visual similarity model 202 that corresponds to the same version value 702 as is associated with the received font image 308. Using the selected font visual similarity model 202, the font service module 116 computes a font descriptor 110 that corresponds to the image 308 and is associated with the version value 702. The font service module 116 transmits the font descriptor 110 in association with the version value 702 to the document presentation module 114 of the destination computing device 104.

The font service module 116 links 602 the received font descriptor 110 with the local font 206 and stores them together in an entry of a data structure, such as a font descriptor-to-local font database 212 (of FIGS. 2 and 5). The entry is also marked with the associated version value 702. The document presentation module 114 repeats the process to acquire a font descriptor 110 for a particular version value 702 for each local font 206. The document presentation module 114 can then determine a similar font descriptor 210 to the received font descriptor 110 given the applicable version value 702.

Thus, a versioning system implementation includes multiple font visual similarity models 202 that correspond to respective versions at a service computing device 106. Alternatively, instead of relying on a font service module 116 to have multiple font visual similarity models 202 of different versions, other versioning system implementations can entail a document preparation module 112 or a document presentation module 114 having multiple such font visual similarity models 202 that respectively correspond to a different version value 702. Additionally or alternatively, a module may be capable of converting one font descriptor 110 associated with one version value 702 to another font descriptor 110 associated with a newer (or otherwise different) version value 702 for the same font.

In alternative embodiments, a font 208 may be represented by a font identifier. The font identifier may be unique on a given computing device to keep track of local fonts 206. Such a font identifier may be transmitted to a service computing device 106 and returned with a font descriptor 110 to facilitate matching the returned font descriptor 110 to the correct local font 206. Further, a font identifier may be unique with respect to a common infrastructure. Examples of a common infrastructure include a single application, a given ecosystem (e.g., that is built by a single company or a number of affiliated companies), a particular operating system, and so forth. If two different computing devices are operating with the same common infrastructure, matching fonts may be determined using such a font identifier.

In other embodiments, a module (such as a font service module 116) may determine that a font exists that closely matches a font descriptor 110 received from another computing device. The destination user 124, or the destination computing device 104 thereof, may not have a legal right (e.g., a license) to use the matching font or may not possess the matching font as a local font 206. The module can therefore suggest one or more matching fonts. In such cases, the module can extend an offer to procure a matching font to the destination user 124. The offer can include an opportunity to pay for the matching font.

Figure 8:
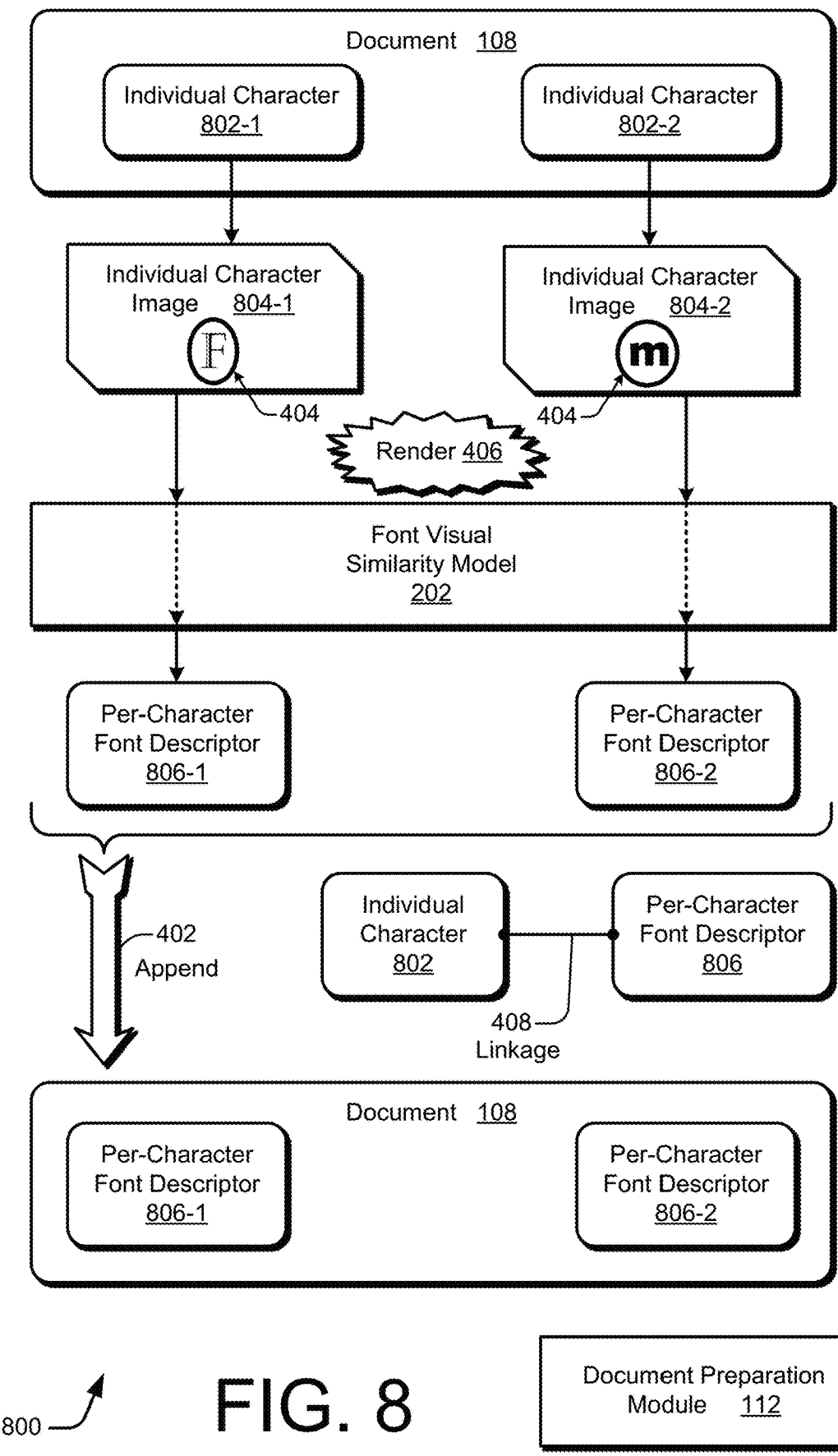
FIG. 8 illustrates an example approach to document preparation by a source computing device in which a per-character font descriptor is appended to a document prior to transmission of the document.

FIG. 8 illustrates an example approach 800 to document preparation by a source computing device 102 (of FIG. 1) in which a per-character font descriptor 806 is appended 402 to a document 108 prior to transmission of the document 108. In some circumstances, different characters that are originally rendered by a given font that is selected by a designer at a source computing device may each be more similar to respective characters of different local fonts at a destination computing device or more similar as a subset of characters of the given font with respect to a particular local font than would be the entire set of characters of the given font. If many different characters of the given font are used in a document, or if the document is intended to be edited by a destination user, the given font can be replaced by a single font that best matches the given font overall. However, if a document only has a few characters, or if the document is intended to be read-only, a truer representation of the design intentions of the creative professional may be achieved using a character-based approach to font replacement. To do so, a per-character font descriptor is appended to the document for each such individual character of the document. A more visually-accurate reproduction of the appearance of the text as intended by the designer can be achieved with a character-by-character approach, but more metadata (e.g., multiple font descriptors are appended to a document) and more processing (e.g., more font descriptor computations and more font descriptor comparisons) are involved with per-character font descriptors.

An example of a per-character font replacement implementation is specifically described below in a document preparation context. In this example, the operation proceeds from top to bottom of FIG. 8, and the created document 108 includes two individual characters 802-1 and 802-2 that are intended to be displayed in accordance with some associated font (not explicitly shown in FIG. 8). However, more or fewer than two individual characters 802 can be included in a document 108. Each individual character 802 corresponds to an individual character image 804 including a single glyph 404 that is rendered for the individual character 802 in accordance with the associated font. The document preparation module 112 can, for example, render 406 each individual character image 804 to produce a bitmapped file representing a visual appearance of the corresponding individual character 802 using the associated font. Thus, individual characters 802-1 and 802-2 respectively correspond to individual character images 804-1 and 804-2.

The document preparation module 112 inputs each image 804 into the font visual similarity model 202. The font visual similarity model 202 produces a respective per-character font descriptor 806 based on the visual appearance of the corresponding individual character as realized by each respective individual character image 804. Hence, a per-character font descriptor 806-1 corresponds to the individual character 802-1, and a per-character font descriptor 806-2 corresponds to the individual character 802-2. The document preparation module 112 appends 402 each respective per-character font descriptor 806 to the document 108. Thus, the per-character font descriptors 806-1 and 806-2 are appended to the document 108. Each per-character font descriptor 806 can be appended by inserting the per-character font descriptor 806 into the document 108, by adding the per-character font descriptor 806 to metadata of the document 108, by using the per-character font descriptor 806 as a character identifier in the document 108, some combination thereof, and so forth.

In one example implementation, the document preparation module 112 determines a per-character font descriptor 806 for a corresponding individual character 802 using the font visual similarity model 202 each time a document 108 is finalized or being prepared for transmission to a remote computing device. Alternatively, the document preparation module 112 determines a per-character font descriptor 806 for an individual character 802 by accessing a data structure, such as a font descriptor-to-local font database 212 (of FIG. 2). To produce the font descriptor-to-local font database 212 for per-character font replacement scenarios, the document preparation module 112 establishes a linkage 408 between an individual character 802 and a corresponding per-character font descriptor 806. The linkage 408 is stored for subsequent use as an entry in the font descriptor-to-local font database 212 that associates the individual character 802 to the per-character font descriptor 806. The linkages 408 can be created and stored on-demand as documents 108 are prepared for transmission or preemptively (e.g., pre-computed) prior to a font for any particular individual character 802 being omitted from a document 108 to be transmitted.

In other example implementations, the document preparation module 112 can determine a per-character font descriptor 806 for a corresponding individual character 802 by making a request to a remote location, such as to a font service module 116 at a service computing device 106 (e.g., of FIGS. 1 and 6). The remote location returns a per-character font descriptor 806 based on an individual character image 804 sent as part of the request by the document preparation module 112. This implementation is described above with reference to FIG. 6 in the context of multi-character font replacement. Requests to a remote location can be made on-demand, or per-character font descriptors 806 can be preemptively prefetched. Received per-character font descriptors 806 can be incorporated into a local font descriptor-to-local font database 212.

A per-character approach to font replacement is specifically described above with reference to FIG. 8 in the context of document preparation at a source computing device 102 (of FIG. 1). However, a per-character approach to font replacement can also be implemented by a document presentation module 114 of a destination computing device 104 or a font service module 116 of a service computing device 106. By way of example, two different per-character approaches to font replacement are specifically described below with reference to FIG. 9 in the context of document presentation.

Figure 9:
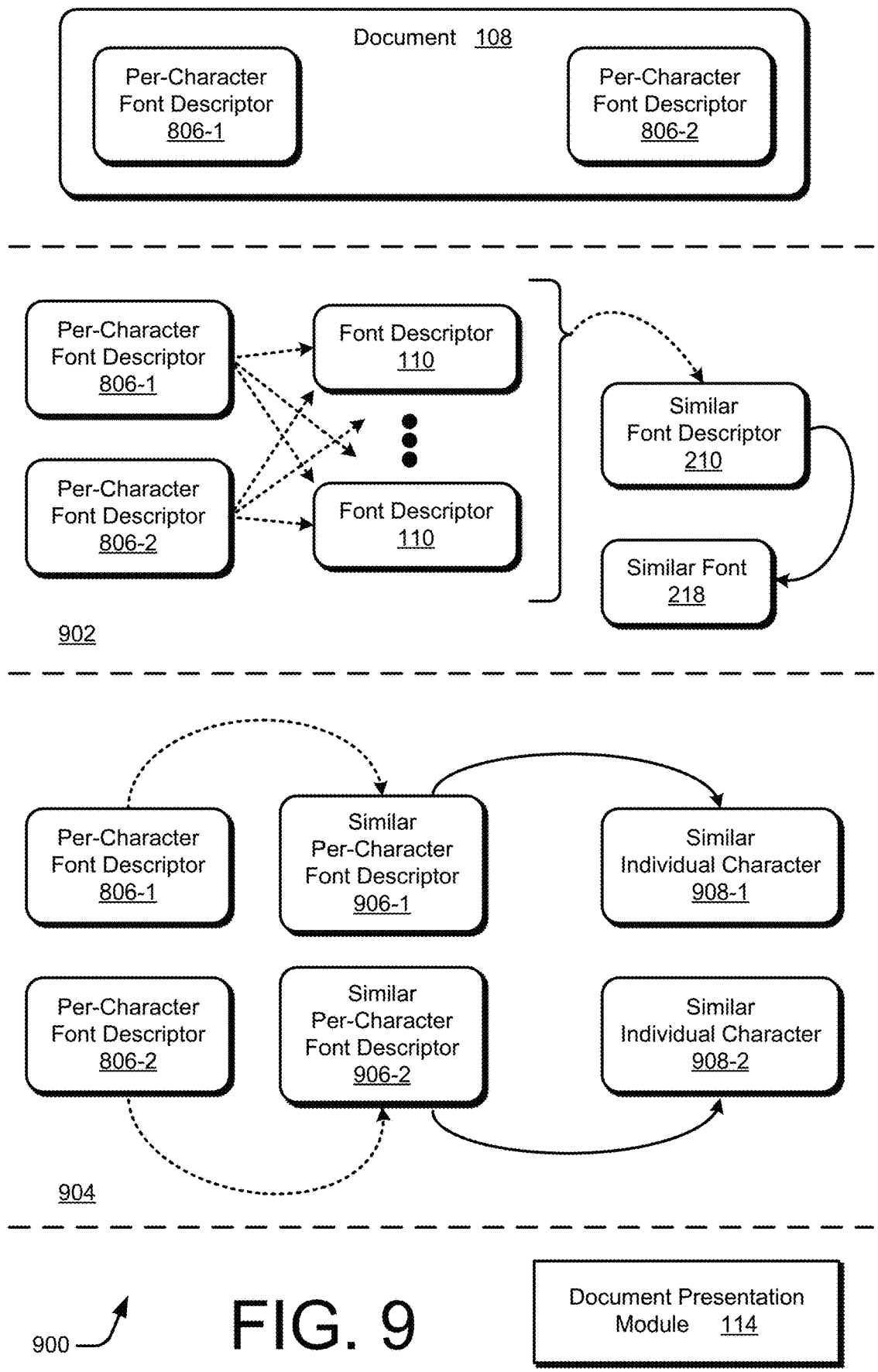
FIG. 9 illustrates example approaches to document presentation by a destination computing device in which a similar font or a similar individual character is determined from at least one per-character font descriptor of a document.

FIG. 9 illustrates generally at 900 example approaches 902 and 904 to document presentation by a destination computing device 104 (of FIG. 1) in which a similar font 218 or a similar individual character 908 is determined (e.g., as part of a determination 214 of FIGS. 2 and 5) from at least one per-character font descriptor 806 of a document 108. In the approach 902, multiple per-character font descriptors 806 of a single original font at a source computing device 102 are used to produce a similar font 218 that is to be used to present each of the individual characters 802 (of FIG. 8) corresponding to the multiple per-character font descriptors 806. Each of the individual characters 802 from the single original font are presented with the single similar font 218 for consistency of appearance and to facilitate an aesthetically-pleasing appearance, such as due to well-behaved kerning for inter-character spacing. In the approach 904, multiple per-character font descriptors 806 of a single original font at a source computing device 102 are used to produce a respective similar individual character 908 for each of the individual characters 802 corresponding to the multiple per-character font descriptors 806. With this latter approach 904, the appearance of each individual character can best match the appearance of each individual character 802 as intended by the designer, but inter-character consistency and overall formatting may be impacted. For both approaches, a document presentation module 114 initially extracts at least one per-character font descriptor 806 from a document 108.

In the approach 902, the document presentation module 114 computes an aggregate font similarity metric based on the extracted per-character font descriptors 806-1 and 806-2. Each extracted per-character font descriptor 806 is compared pairwise with a particular font descriptor 110 to determine a distance between the particular font descriptor 110 and a respective per-character font descriptor 806. The distances across the multiple per-character font descriptors 806 are aggregated into an aggregate distance for the particular font descriptor 110. For example, the aggregate distance can be computed based on the sum of the distances or the sum of the squared distances between each per-character font descriptor 806 and the particular font descriptor 110. The document presentation module 114 determines a respective aggregate distance for each of the font descriptors 110 that correspond to local fonts 206 (of FIGS. 2 and 5). The similar font descriptor 210 is determined based on the aggregate distances. For instance, the font descriptor 110 corresponding to the strongest aggregate distance (e.g., the smallest aggregate distance) is determined as the similar font descriptor 210. The document presentation module 114 ascertains the similar font 218 that corresponds to this determined similar font descriptor 210. Each of the individual characters 802 (of FIG. 8) of the single original font is then presented using the similar font 218.

In the approach 904, each individual character 802 can be presented using a different local font 206, depending on a similarity analysis. The document presentation module 114 determines a similar per-character font descriptor 906-1 and 906-2 based on a respective extracted per-character font descriptor 806-1 and 806-2. To do so, a font descriptor-to-local font database 212 can be consulted. The font descriptor-to-local font database 212 includes multiple entries, with each entry associating an individual character 802 of a local font 206 with a corresponding per-character font descriptor 806.

As part of the determination, the document presentation module 114 compares the extracted per-character font descriptor 806 to the per-character font descriptors 806 in the entries of the font descriptor-to-local font database 212. Respective distances between the extracted per-character font descriptor 806 and respective ones of the per-character font descriptors 806 from the database 212 are calculated. The distances can comprise semantic distances indicative of how similar or not similar the visual appearances of two individual characters 802 are as captured by the respective per-character font descriptors 806. One or more of the smaller or smallest distances are ascertained. The document presentation module 114 determines the similar per-character font descriptor 906 based on these ascertained distances. For example, the per-character font descriptor 806 from the database 212 having the smallest distance from the extracted per-character font descriptor 806 can be ascertained as the similar per-character font descriptor 906. The individual character 802 corresponding to the ascertained similar per-character font descriptor 906 is deemed the similar individual character 908 and used to present the document 108. Thus, each individual character 802-1 and 802-2 (of FIG. 8) is presented as a respective similar individual character 908-1 and 908-2, which may correspond to different local fonts 206 even though the individual characters 802 at the source computing device 102 were associated with the single original font.

Having discussed example details of systems, techniques, and schemes for font replacement based on visual similarity, consider now some example procedures to illustrate additional aspects of the techniques.

Example Procedures

Figure 10:
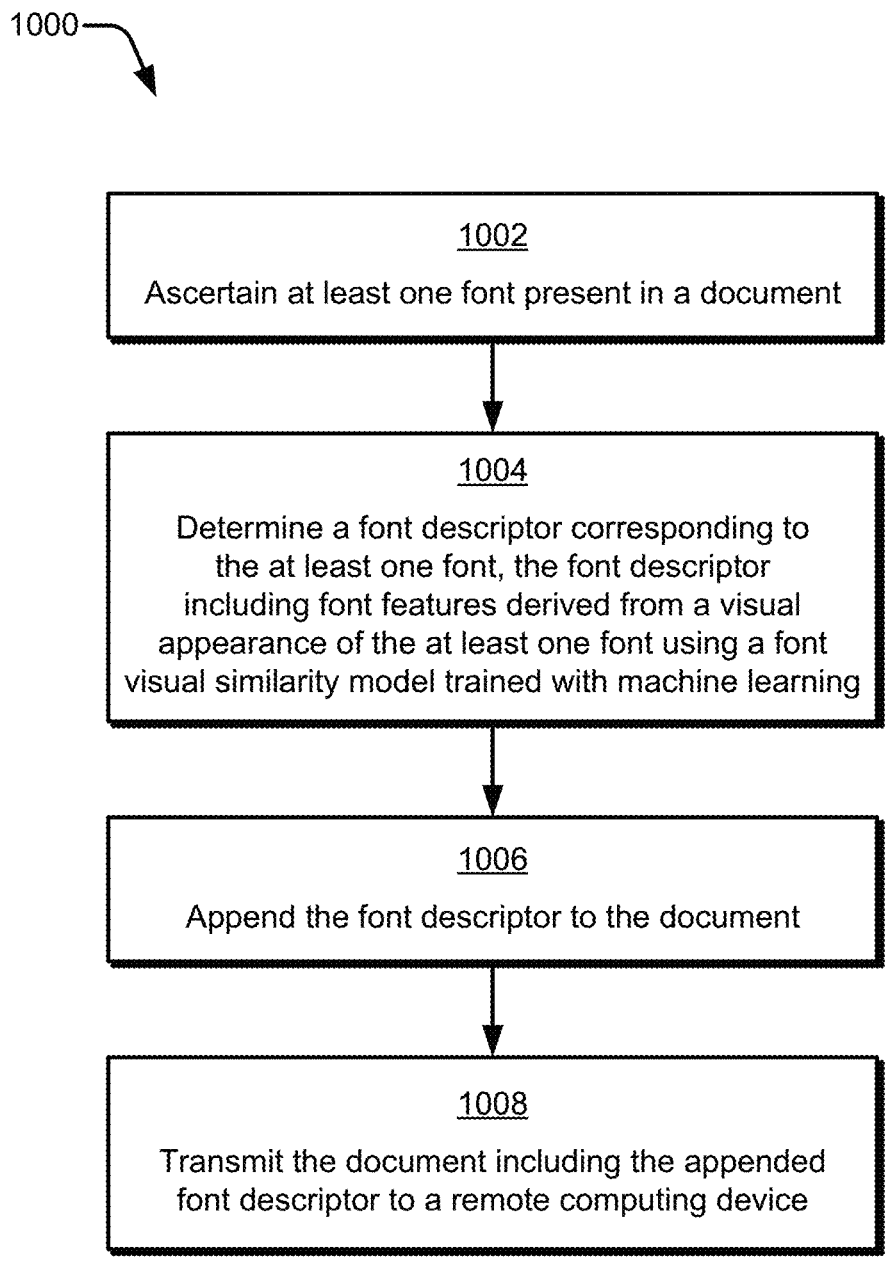
FIG. 10 is a flow diagram illustrating an example procedure for a source computing device in accordance with one or more example embodiments.
Figure 11:
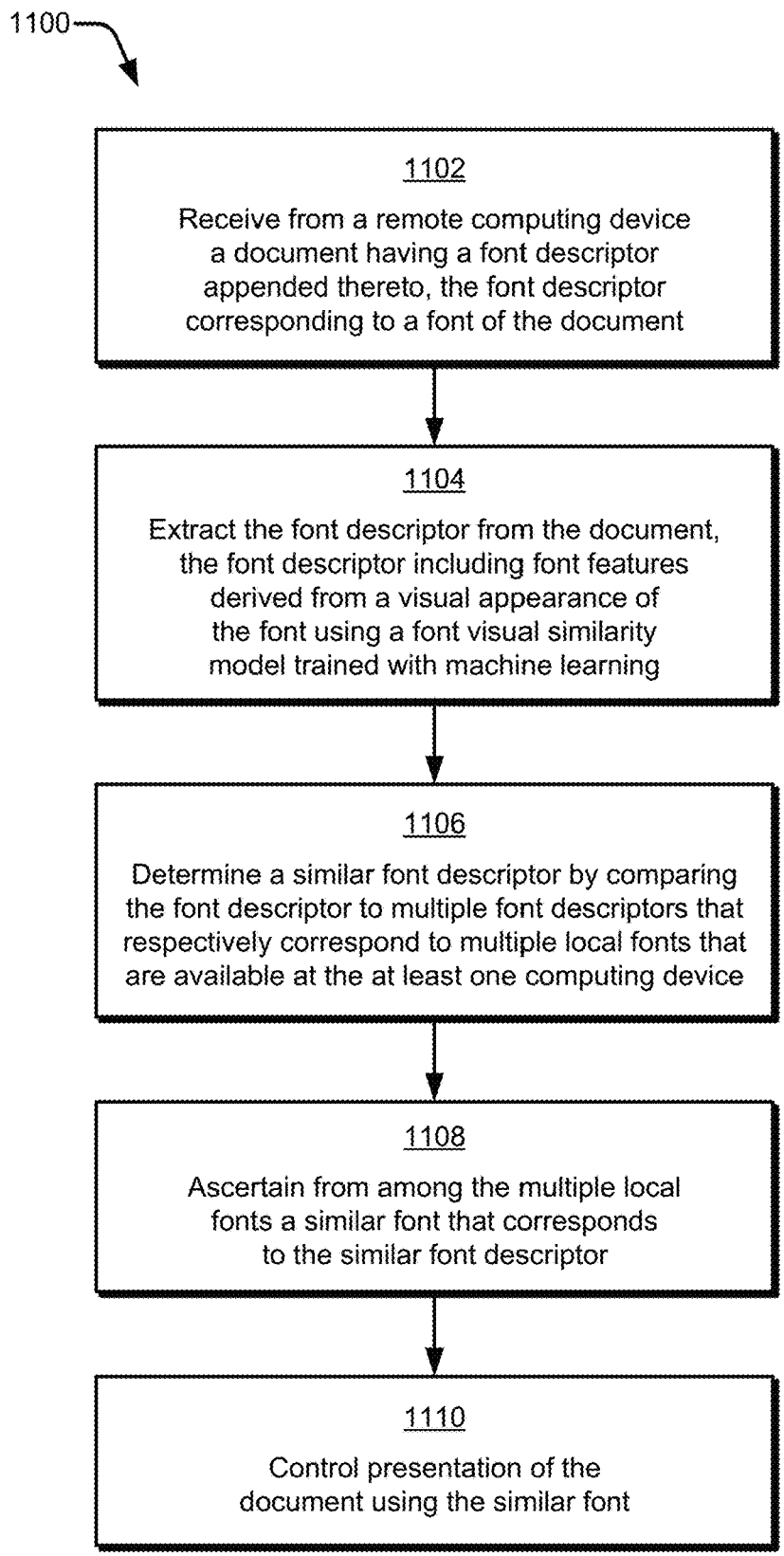
FIG. 11 is a flow diagram illustrating an example procedure for a destination computing device in accordance with one or more example embodiments.
Figure 12:
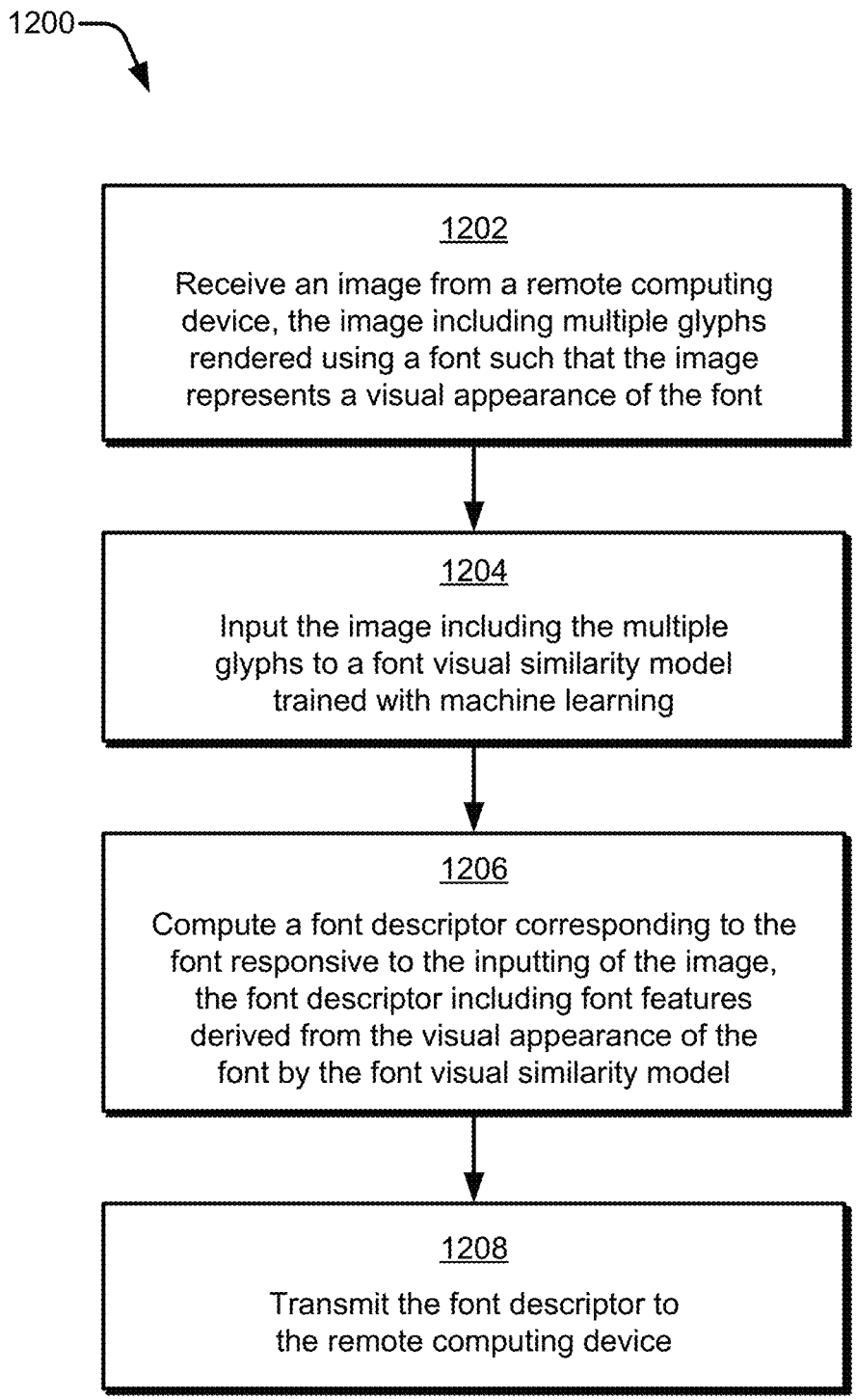
FIG. 12 is a flow diagram illustrating an example procedure for a service computing device in accordance with one or more example embodiments.

This section describes with reference to FIGS. 10-12 example procedures relating to font replacement based on visual similarity in one or more embodiments. Aspects of the procedures may be implemented in hardware, firmware, or software, or a combination thereof. The procedures are shown as sets of blocks specifying operations that may be performed by one or more devices, but performance of the operations is not necessarily limited to the orders as shown by the respective blocks or as described herein, for the operations may be performed in other orders or in fully or partially overlapping manners. In at least some embodiments, the procedures may be performed by a suitably configured device, such as an example computing device 102, 104, or 106 (of FIG. 1) or an example computing device 1302-1, 1302-2, or 1302-3 (of FIG. 13) using a respective module 112, 114, or 116 (e.g., of FIGS. 1 and 13).

FIG. 10 is a flow diagram 1000 that includes four blocks 1002-1008 and that illustrates an example procedure for font replacement based on visual similarity in accordance with one or more example embodiments. At block 1002, at least one font present in a document is ascertained. For example, a source computing device 102 can ascertain at least one font 208 that is present in a document 108. For instance, a document preparation module 112 may identify a local font 206 as the font 208 that a designer has selected for text included in a document 108.

At block 1004, a font descriptor corresponding to the at least one font is determined, with the font descriptor including multiple font features derived from a visual appearance of the at least one font using a font visual similarity model trained with machine learning. For example, the source computing device 102 can determine a font descriptor 110 corresponding to the at least one font 208. The font descriptor 110 includes multiple font features 310 derived from a visual appearance of the at least one font 208 using a font visual similarity model 202 trained with machine learning 204. To do so, the document preparation module 112 may input a font image 308 including multiple glyphs 404 that are rendered in accordance with the font 208 to a font visual similarity model 202. The font descriptor 110 extracted from a layer 316 of the font visual similarity model 202 includes multiple font features 310. Alternatively, the document preparation module 112 can outsource the computation of the font descriptor 110 to a font service module 116.

At block 1006, the font descriptor is appended to the document. For example, the source computing device 102 can append the font descriptor 110 to the document 108. The document preparation module 112 may inject the font descriptor 110 into metadata of the document 108. At block 1008, the document including the appended font descriptor is transmitted to a remote computing device. For example, the source computing device 102 can transmit the document 108 including the appended font descriptor 110 to a remote computing device. To transmit the document 108, the document preparation module 112 can send the document 108 over a network 118 to a destination computing device 104.

FIG. 11 is a flow diagram 1100 that includes five blocks 1102-1110 and that illustrates an example procedure for font replacement based on visual similarity in accordance with one or more example embodiments. At block 1102, a document having a font descriptor appended thereto is received from a remote computing device, with the font descriptor corresponding to a font of the document. For example, a destination computing device 104 can receive from a remote computing device a document 108 having a font descriptor 110 appended thereto. The font descriptor 110 corresponds to a font 208 of the document 108. A document presentation module 114 may receive the document 108 having the font descriptor 110 appended thereto from a source computing device 102.

At block 1104, the font descriptor is extracted from the document, with the font descriptor including multiple font features derived from a visual appearance of the font using a font visual similarity model trained with machine learning. For example, the destination computing device 104 can extract the font descriptor 110 from the document 108. The font descriptor 110 includes multiple font features 310 derived from a visual appearance of the font 208 using a font visual similarity model 202 trained with machine learning 204.

At block 1106, a similar font descriptor is determined by comparing the font descriptor to multiple font descriptors that respectively correspond to multiple local fonts that are available at the computing device. For example, the destination computing device 104 can determine a similar font descriptor 210 by comparing the font descriptor 110 to multiple font descriptors 110 that respectively correspond to multiple local fonts 206 that are available at the destination computing device 104. To do so, the document presentation module 114 may access a font descriptor-to-local font database 212 having multiple entries, with each entry associating a respective font descriptor 110 with a respective local font 206. The entries of the database 212 can be built by locally computing font descriptors with a font visual similarity model 202 or by outsourcing the computation to a service computing device 106. The determination of the similar font descriptor 210 may be based on pairwise distances between the received font descriptor 110 and the multiple font descriptors 110 of the font descriptor-to-local font database 212.

At block 1108, from among the multiple local fonts, a similar font that corresponds to the similar font descriptor is ascertained. For example, the destination computing device 104 can ascertain from among the multiple local fonts 206 a similar font 218 that corresponds to the similar font descriptor 210. To do so, the document presentation module 114 may identify the local font 206 associated with the similar font descriptor 210 within an entry of the font descriptor-to-local font database 212.

At block 1110, presentation of the document using the similar font is controlled. For example, the destination computing device 104 can control presentation 216 of the document 108 using the similar font 218. The document presentation module 114 may, for instance, cause the document 108 to be displayed on a display screen with text rendered using the similar font 218.

FIG. 12 is a flow diagram 1200 that includes four blocks 1202-1208 and that illustrates an example procedure for font replacement based on visual similarity in accordance with one or more example embodiments. At block 1202, an image is received from a remote computing device, with the image including multiple glyphs rendered using a font such that the image represents a visual appearance of the font. For example, a service computing device 106 can receive a font image 308 from a remote computing device, such as a source computing device 102 or a destination computing device 104. The font image 308 includes multiple glyphs 404 rendered 406 using a font 208 such that the image 308 represents a visual appearance of the font 208. A font service module 116 may receive a font image 308 from a document preparation module 112 or a document presentation module 114 that wishes to outsource font descriptor computation.

At block 1204, the image including the multiple glyphs is input to a font visual similarity model trained with machine learning. For example, the service computing device 106 can input the font image 308 including the multiple glyphs 404 to a font visual similarity model 202 trained with machine learning 204. The font service module 116 may input the image 308 to a font visual similarity model 202 associated, for instance, with a version value 702 that matches a version value 702 received with the image 308, if any.

At block 1206, a font descriptor corresponding to the font is computed responsive to the inputting of the image, with the font descriptor including multiple font features derived from the visual appearance of the font by the font visual similarity model. For example, the service computing device 106 can compute a font descriptor 110 corresponding to the font 208 responsive to the inputting of the image 308 into the font visual similarity model 202 trained with machine learning 204. The font descriptor 110 includes multiple font features 310 derived from the visual appearance of the font 208 by the font visual similarity model 202. The font features 310 may, for instance, be extracted from respective nodes 314 of an internal layer 316 of a font visual similarity model 202 that is realized with a convolutional artificial neural network.

At block 1208, the font descriptor is transmitted to the remote computing device. For example, the service computing device 106 can transmit the font descriptor 110 to the remote computing device. To deliver a requested font descriptor, the font service module 116 may transmit the computed font descriptor 110 to a remote document preparation module 112 or document presentation module 114 via at least one network 118.

Having described example procedures in accordance with one or more embodiments, consider now an example system and device that can be utilized to implement the various schemes and techniques described herein.

Example System and Device

Figure 13:
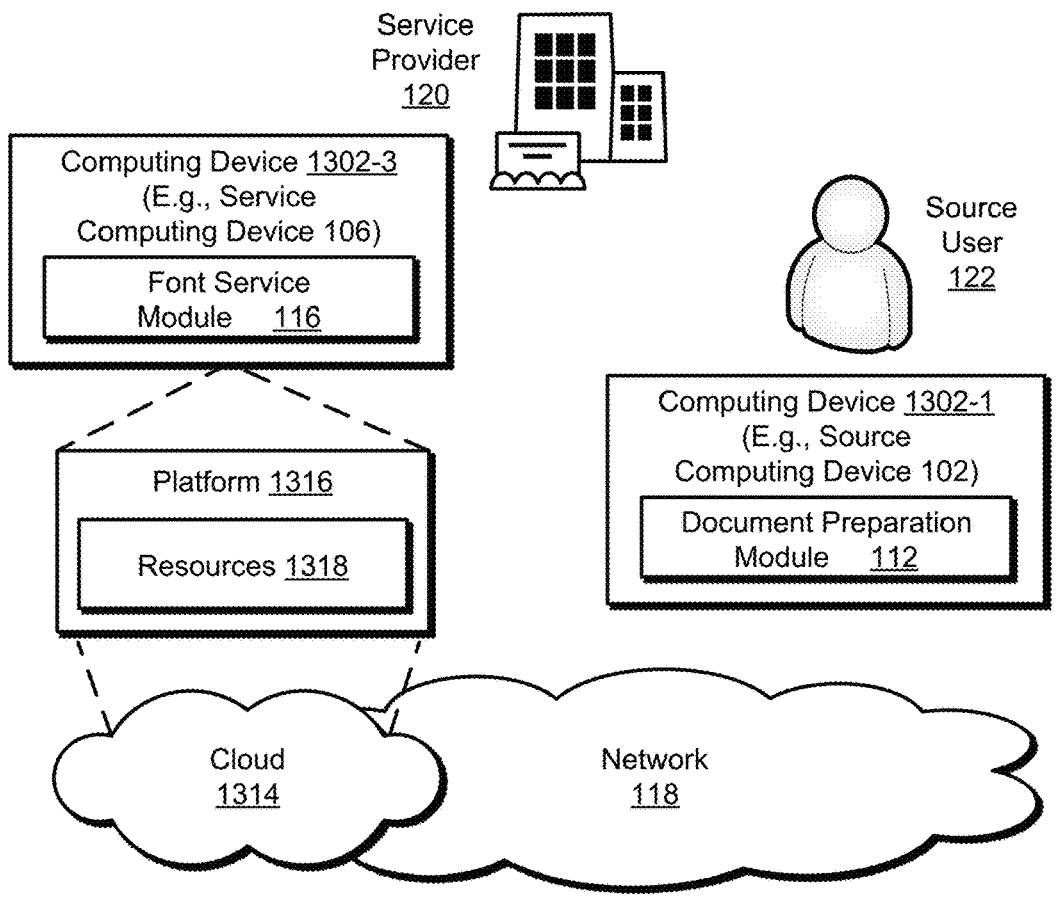
FIG. 13 illustrates an example system including various components of three example computing devices that can be employed for one or more embodiments of font replacement based on visual similarity.
Figure 13:
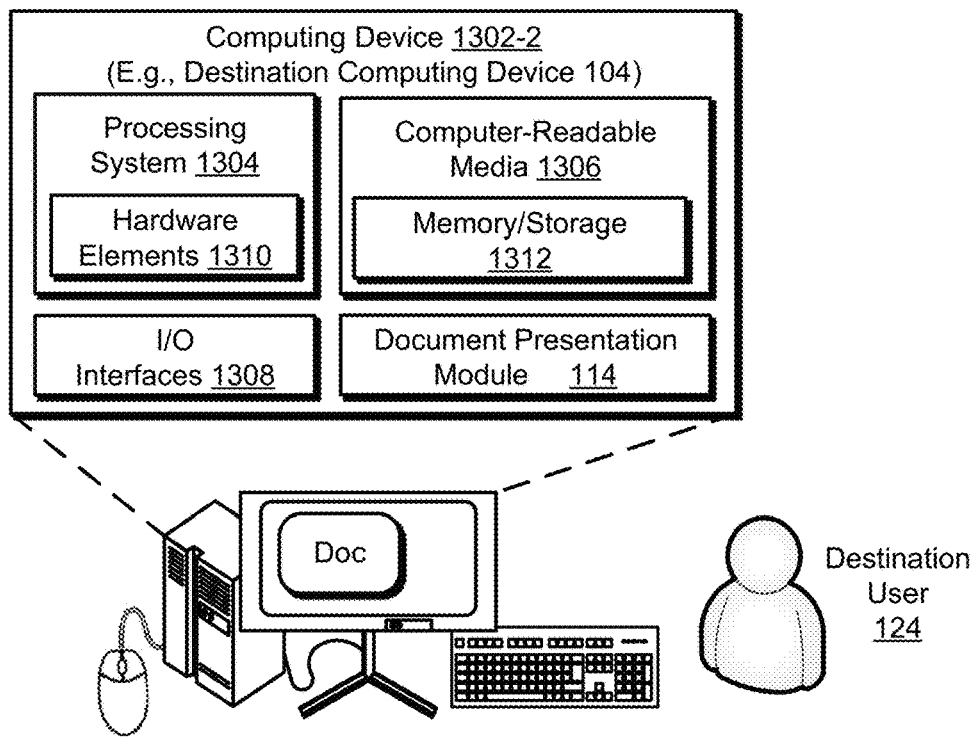

FIG. 13 illustrates an example system generally at 1300 including example computing devices 1302 representative of one or more computing systems or computing devices that may implement the various techniques described herein. This is illustrated through the inclusion of various modules, which may operate as described herein above, at three computing devices 1302-1, 1302-2, and 1302-3 that can be coupled one to another via the network 118. Generally, a computing device 1302 may be implemented as, for example, a source computing device 102 having a document preparation module 112 for a source user 122, a destination computing device 104 having a document presentation module 114 for a destination user 124, a service computing device 106 having a font service module 116 for a service provider 120, an on-chip system or system-on-a-chip (SOC) (not explicitly shown), or any other suitable computing device or computing system.

In an example implementation as shown in FIG. 13, the font service module 116 is executing in the cloud (e.g., on a network-side computing device) via the network 118, such as the internet. However, any of the described modules may execute in the cloud, including on behalf of a corporate user. Although individual device components are specifically illustrated with respect to one particular device (e.g., the computing device 1302-2), such components may be included in the other illustrated devices.

The example computing device 1302 as illustrated includes at least one processing system 1304, one or more computer-readable media 1306, and one or more I/O interfaces 1308 that may be communicatively coupled, one to another. Although not explicitly shown, the computing device 1302 may further include a system bus or other data and command transfer system that couples the various components, one to another. A system bus can include any one or combination of different bus structures, such as a memory bus or memory controller, a peripheral bus, a universal serial bus, or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including one or more hardware elements 1310 that may be implemented as processors, functional blocks, and so forth. This may include implementation in hardware as an application specific integrated circuit (ASIC), a general-purpose processor, or other logic device formed using e.g. one or more semiconductors. The hardware elements 1310 are not limited by the materials from which they are formed or the processing mechanisms employed therein. For example, processors may include or may be realized with semiconductor(s) or transistors (e.g., electronic integrated circuits (ICs)). In such a context, processor-executable instructions may comprise electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (e.g., random access memory (RAM)) or nonvolatile media (e.g., read only memory (ROM), flash memory, optical discs, or magnetic disks). The memory/storage component 1312 may include fixed media (e.g., RAM, ROM, or a fixed hard drive) or removable media (e.g., a flash memory card, a removable hard drive, or an optical disc). The computer-readable media 1306 may be implemented in a variety of other ways as further described below.

The input/output interface(s) 1308 are representative of functionality to allow a user to enter commands or information to computing device 1302 or to allow information to be presented to the user, or other components or devices using various input/output devices. Examples of input devices include a keyboard, a cursor control device (e.g., a mouse or touchpad), a microphone, a scanner, touch functionality (e.g., capacitive, resistive, or other sensors implemented to detect physical touch), a camera (e.g., which may employ visible or non-visible wavelengths such as infrared frequencies to recognize movement as gestures that need not involve touch), an accelerometer, or a combination thereof. Examples of output devices include a display device (e.g., a liquid crystal display (LCD) screen, a light-emitting diode (LED) display screen, a monitor, or a projector), a speaker, a printer, a network card, a haptic vibrating device, or a combination thereof. Thus, the computing device 1302 may be implemented in a variety of ways as further described below to support local or remote user interaction.

Various techniques may be described herein in the general context of software, hardware elements, or program modules. Generally, such modules may include routines, programs, objects, elements, components, data structures, combinations thereof, and so forth that perform particular tasks or implement particular abstract data types. The terms "module," "functionality," and "component" as used herein generally represent software, firmware, hardware, or a combination thereof. The features of the techniques described herein may be platform-independent, meaning that the described techniques may be implemented on a variety of commercial computing platforms having a variety of processors.

An embodiment of the described modules, and techniques thereof, may be stored on or transmitted across some form of computer-readable media. The computer-readable media 1306 may include a variety of media that may be accessed by the computing device 1302. By way of example, and not limitation, computer-readable media may include "computer-readable storage media" and "computer-readable signal media."

"Computer-readable storage media," as used herein, refers to media or devices that enable persistent and/or non-transitory storage of information in contrast to mere signal transmission, carrier waves, or signals per se. Computer-readable storage media does not include signals per se or signal bearing media. The computer-readable storage media includes hardware such as volatile and non-volatile, as well as removable and non-removable, media or storage devices implemented in a process or technology suitable for storage of information, such as computer readable instructions, data structures, program modules, logic elements/ circuits, or other data. Examples of computer-readable storage media may include, but are not limited to, RAM, ROM, EEPROM, flash memory, or other e.g. solid state memory technology; CD-ROM, digital versatile discs (DVD), or other optical storage; hard disks, magnetic cassettes, magnetic tape, magnetic disk storage, or other magnetic storage devices; or another storage device, tangible medium, article of manufacture, or combination thereof that is suitable to store desired information and that may be accessed by a computer.

"Computer-readable signal media," as used herein, refers to a signal-bearing medium implemented to transmit instructions to hardware of the computing device 1302, such as via a network. Computer-readable signal media typically may embody computer readable instructions, data structures, program modules, or other data in a modulated data signal, such as carrier waves, data signals, or another transport mechanism. Computer-readable signal media may also include any information delivery media. The term "modulated data signal" means a signal having one or more of its characteristics set or changed in such a manner as to encode information in the signal. By way of example, but not limitation, computer-readable signal media may include wired media, such as a wired network or direct-wired connection, or wireless media, such as acoustic, RF, microwave, infrared, or other wireless media.

As previously described, hardware elements 1310 and computer-readable media 1306 may be representative of modules, programmable device logic, fixed device logic, a combination thereof, and so forth that is implemented in a hardware form that may be employed in some embodiments to implement at least some aspects of the techniques described herein, such as to perform one or more instructions or computing actions.

Hardware may include components of an integrated circuit (IC) or on-chip system, an ASIC, a field-programmable gate array (FPGA), a complex programmable logic device (CPLD), or other implementations in silicon or other hardware. In this context, hardware may operate as a processing device that performs program tasks defined by instructions or logic embodied by the hardware as well as hardware utilized to store instructions for execution, e.g., the computer-readable storage media described previously.

Combinations of the foregoing may also be employed to implement various techniques described herein. Accordingly, software, hardware, or executable modules may be implemented as one or more instructions or logic embodied on some form of computer-readable storage media or by one or more hardware elements 1310. The computing device 1302 may be configured to implement particular instructions or functions corresponding to software or hardware modules. Accordingly, implementation of a module executable by the computing device 1302 as software may be achieved at least partially in hardware, e.g., through use of computer-readable storage media or the hardware elements 1310 of the processing system 1304. The instructions or functions may be executable/operable by one or more articles of manufacture (e.g., one or more computing devices 1302 or processing systems 1304) to implement techniques, modules, or examples described herein.

The techniques described herein may be supported by various configurations of the computing device 1302 and are not limited to the specific aspects of the example devices described herein. This functionality may also be implemented fully or partially through use of a distributed system, such as over a "cloud" 1314 via a platform 1316 as described below.

The cloud 1314 may include or represent a platform 1316 for resources 1318. The platform 1316 abstracts underlying functionality of hardware (e.g., one or more servers or at least one data center) and software resources of the cloud 1314. The resources 1318 may include applications or data that can be utilized while computer processing is at least partially executed on servers remote from, or distributed around, the computing device 1302. Resources 1318 may also include services provided over the Internet or through a subscriber network, such as a cellular or Wi-Fi network.

The platform 1316 may abstract resources and functions to connect the computing device 1302 with other computing devices or services. The platform 1316 may also serve to abstract a scaling of resources to provide a corresponding level of scale to encountered demand for the resources 1318 implemented via the platform 1316. Accordingly, in an interconnected device embodiment, implementation of functionality described herein may be distributed throughout the illustrated system of FIG. 13, or at least throughout the cloud 1314 along with the computing device 1302. For example, functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a service computing device, the method comprising:
receiving, by the service computing device, an image representing a visual appearance of a font by including multiple glyphs rendered in the font;
inputting, by the service computing device, the image to a font visual similarity model trained with a machine learning system;
computing, by the service computing device, a font descriptor corresponding to the font, the font descriptor including a version value of the font visual similarity model; and
generating, by the service computing device, a suggestion that includes one or more matching fonts, the one or more matching fonts determined visually similar to the font based on a pairwise difference between a feature vector of the font descriptor and a feature vector associated with the one or more matching fonts.

2. The method as described in claim 1, wherein the suggestion includes an offer to procure the one or more matching fonts.

3. The method as described in claim 1, wherein the font descriptor includes multiple font features derived from the visual appearance of the font by the font similarity model.

4. The method as described in claim 1, further comprising transmitting the font descriptor to a remote computing device.

5. The method as described in claim 4, wherein the font descriptor is transmitted to the remote computing device appended to a document transmitted to the remote computing device.

6. The method as described in claim 1, further comprising transmitting the suggestion to a remote computing device.

7. The method as described in claim 1, wherein the machine learning system includes a convolutional neural network.

8. A method implemented by a computing device, the method comprising:
receiving, by the computing device, a font descriptor that characterizes a visual appearance of a font as font features, the font descriptor includes a version value corresponding to a font visual similarity model;
determining, by the computing device, a similar font descriptor based on a pairwise difference between a feature vector of the font descriptor and a feature vector of the similar font descriptor; and
rendering, by the computing device, a similar font in a display of a display device, the similar font having a visual similarity to the font.

9. The method as described in claim 8, wherein the font features are derived from the visual appearance of the font using the font visual similarity model trained with machine learning.

10. The method as described in claim 9, wherein the font visual similarity model includes a convolutional neural network.

11. The method as described in claim 8, wherein the similar font descriptor corresponds to the similar font.

12. The method as described in claim 8, wherein the font visual similarity model is one of a plurality of font visual similarity models that are associated with different version values.

13. The method as described in claim 8, wherein the font is not available to the display device and the similar font is a replacement that is available to the display device.

14. The method as described in claim 8, wherein the font descriptor is received by the computing device appended to a document received by the computing device.

15. A system comprising:
a machine learning system; and
a font service module implemented in hardware of at least one computing device to:
receive an image having glyphs of a font;
generate a font descriptor characterizing a visual appearance of the font using the machine learning system, the font descriptor including a version value associated with the machine learning system; and
determine a similar font based on the font descriptor and a pairwise difference between a feature vector of the font descriptor and a feature vector associated with the similar font, the similar font having a visual similarity to the font.

16. The system as described in claim 15, wherein the font service module is further implemented to identify a similar font descriptor using the font descriptor, the similar font descriptor corresponding to the similar font.

17. The system as described in claim 15, wherein the font service module is further implemented to generate a suggestion including an offer to procure the similar font.

18. The system as described in claim 15, wherein the machine learning system includes a convolutional neural network.

19. The system as described in claim 15, wherein the font service module is further implemented to transmit the similar font descriptor to a remote computing device.

20. The system as described in claim 19, wherein the font is not available to the remote computing device and the similar font is available to the remote computing device.

* * * * *